US010037163B2

(12) United States Patent
Tuers et al.

(10) Patent No.: US 10,037,163 B2
(45) Date of Patent: Jul. 31, 2018

(54) SELF-DESCRIBING CLUSTER ASSOCIATION

(71) Applicant: SanDisk Technologies Inc., Plano, TX (US)

(72) Inventors: Daniel Edward Tuers, Kapaa, HI (US); Nicholas Thomas, Sunnyvale, CA (US); Abhijeet Manohar, Bangalore (IN); Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 284 days.

(21) Appl. No.: 14/812,798

(22) Filed: Jul. 29, 2015

(65) Prior Publication Data

US 2017/0031624 A1 Feb. 2, 2017

(51) Int. Cl.
*G06F 3/06* (2006.01)
*G06F 17/30* (2006.01)

(52) U.S. Cl.
CPC .......... *G06F 3/0638* (2013.01); *G06F 3/0604* (2013.01); *G06F 3/0679* (2013.01); *G06F 17/3007* (2013.01)

(58) Field of Classification Search
CPC ...... G06F 3/061; G06F 3/0611; G06F 3/0613; G06F 3/0679; G06F 12/0215; G06F 12/0862
See application file for complete search history.

(56) References Cited

U.S. PATENT DOCUMENTS

| | | | | |
|---|---|---|---|---|
| 8,732,406 | B1* | 5/2014 | Pase | G06F 12/0862 711/113 |
| 9,042,160 | B1* | 5/2015 | Gorobets | G11C 16/10 365/148 |
| 2005/0246487 | A1* | 11/2005 | Ergan | G06F 3/061 711/113 |
| 2008/0086588 | A1* | 4/2008 | Danilak | G06F 13/385 711/103 |
| 2013/0326113 | A1* | 12/2013 | Wakrat | G06F 12/0868 711/103 |
| 2015/0242149 | A1* | 8/2015 | Kim | G06F 3/0688 711/103 |

OTHER PUBLICATIONS

Arpaci-Dusseau et al., Operating Systems: Three Easy Pieces, 2014.*

* cited by examiner

*Primary Examiner* — William Spieler
(74) *Attorney, Agent, or Firm* — Brinks Gilson & Lione

(57) ABSTRACT

A cluster association recognition system and related method are described. The system may identify sequences of data clusters in compilations of cluster journals. The system may generate the compilations by populating the cluster journals with cluster identifications associated with host addresses identified in host read requests. Upon receipt of future read requests, the cluster sequences may be used to identify data sets that are associated with a cluster sequence in order to identify further data sets that a host is likely to request.

15 Claims, 14 Drawing Sheets

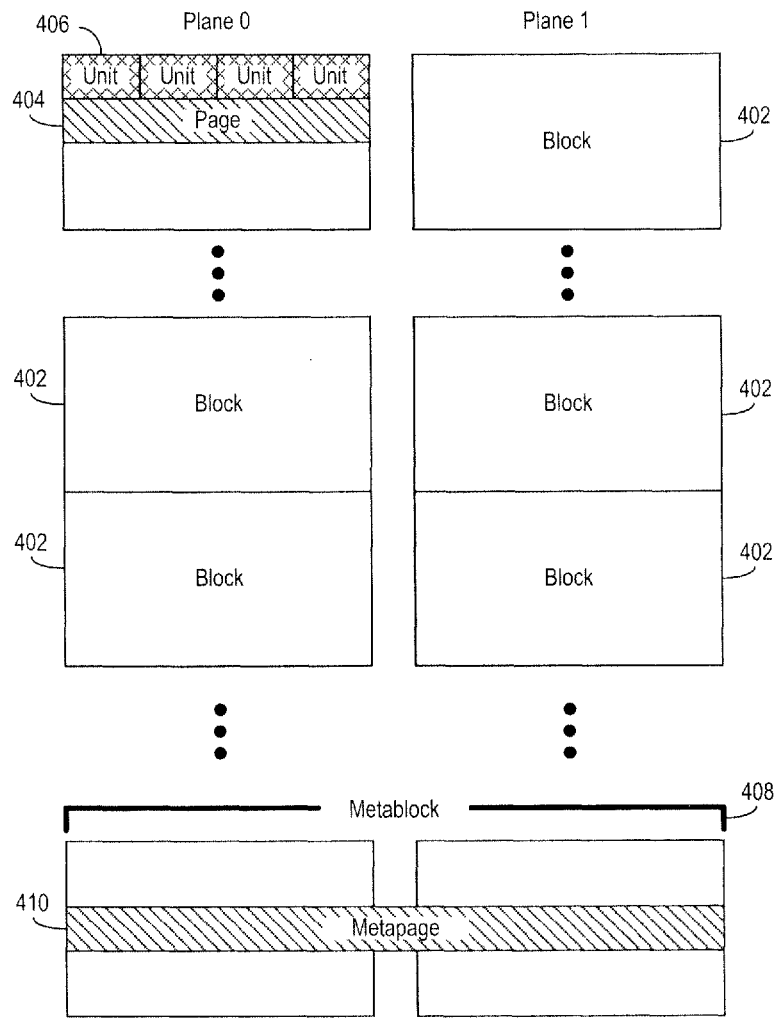
FIG. 4
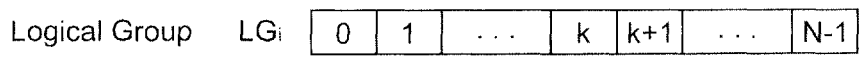
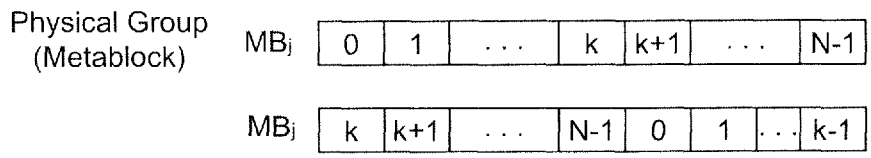
FIG. 5

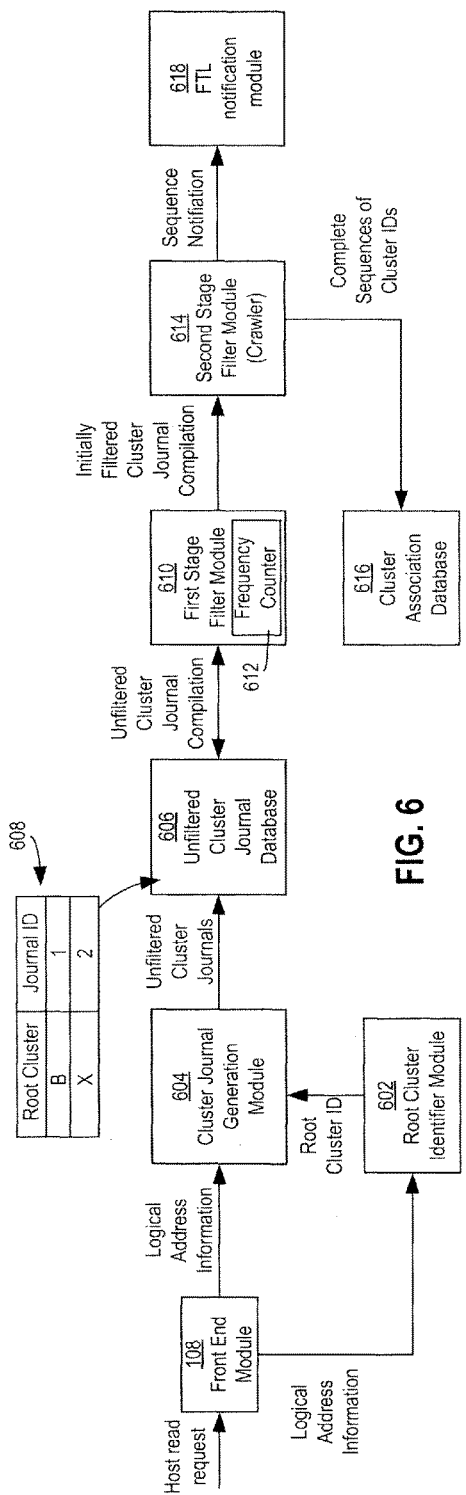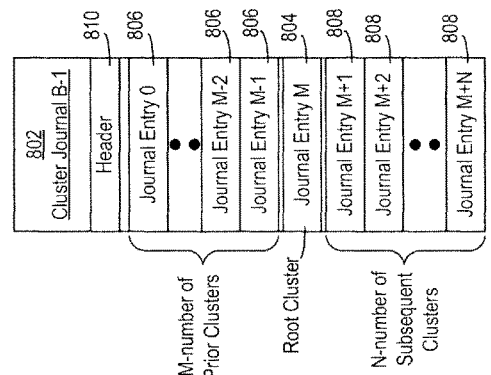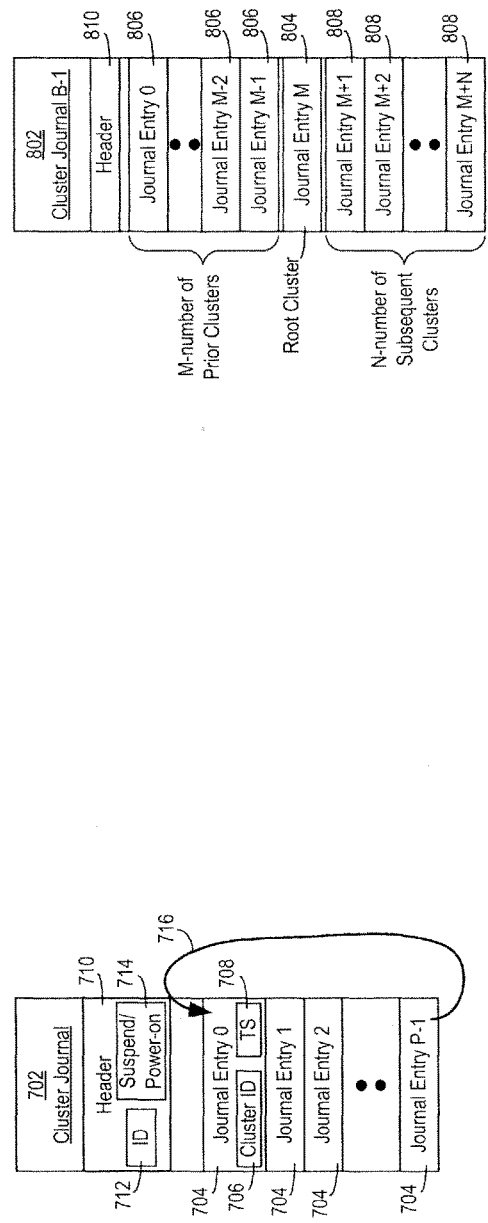

SELF-DESCRIBING CLUSTER ASSOCIATION

BACKGROUND

A host system may send various sets of data to be written to a non-volatile memory system that the host system may then collectively request read simultaneously or around the same time. However, these data sets may not be stored in non-volatile memory in optimal locations so as to maximize the performance when these data sets are read. Further, when storing the data sets and/or retrieving the data sets upon receiving host requests, the non-volatile memory system may recognize them as individual, unassociated requests for data to be read.

Various circumstances may cause the non-volatile memory system to not store the data sets in optimal locations and/or fail to recognize them as being frequently read together. Such circumstances include that the data sets are associated with common application files, such as dynamic-link library (DLL) files, that were stored during installation, the data sets were part of a large sequential software installation but have since been fragmented due to drive wear, the data sets were stored at different times, or the data sets were relatively small in size. As a result of the non-volatile memory system failing to store these data sets in optimal storage locations or recognizing them as being associated, the non-volatile memory system, then, may not return the requested data sets back to the host as quickly as possible.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 4 is a block diagram of an example organizational arrangement or hierarchy of a memory array for flash memory.

FIG. 5 is a schematic diagram of an example mapping between logical groups and metablocks.

FIG. 6 is block diagram of an example cluster association recognition system of the non-volatile memory system of FIG. 2A.

FIG. 7 is a schematic diagram of an example format of a cluster journal.

FIG. 8 is a schematic diagram of an example populated cluster journal.

DETAILED DESCRIPTION OF THE PRESENTLY PREFERRED EMBODIMENTS

Overview

Figure 1A:
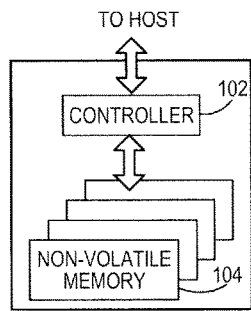
FIG. 1A is a block diagram of an exemplary non-volatile memory system.

Embodiments of the present invention are defined by the claims, and nothing in this section should be taken as a limitation on those claims.

By way of introduction, the following embodiments describe non-volatile memory systems and related methods of identifying associations of data clusters to improve read performance. In one embodiment, a non-volatile memory system may include non-volatile memory, a filter module, an address management module, and a sequencer module. The filter module may be configured to, identify a cluster sequence of cluster identifications (IDs) among a plurality of cluster IDs corresponding to a plurality of data sets stored in the non-volatile memory. The address management module may be configured to receive a host address associated with a data set of the plurality of data sets, determine that the data set is associated with the cluster sequence, and identify at least one other data set of the plurality of data sets that is associated with the cluster sequence. The sequencer module may be configured to send sequencer commands associated with the data set and the at least one other data set to instruct the non-volatile memory to sense the data set and the at least one other data set.

In a second embodiment, a method of retrieving data associated with a cluster sequence stored in non-volatile memory may be performed. The method may include receiving, with an address management module, a host address included in a host read request to request a data set associated with the host address to be read from the non-volatile memory. In addition, the method may include querying, with the address management module, an address data structure to identify a physical address associated with the host address; and in response to querying the address database, identifying, with the address management module, that the data set is associated with a cluster sequence of data clusters. The method may also include querying, with the address management module, a cluster association database that maintains a plurality of cluster sequences; and in response to querying the cluster association database, identifying at least one other data set that is also associated with the cluster sequence. Additionally, the method may include sending, with a sequencer module, commands to the non-volatile memory that instructs the non-volatile memory to sense the data set and the at least one other data set.

In some embodiments, a root cluster identification module may identify a root cluster of data, and the filter module may identify the cluster sequence for the root cluster.

In some embodiments, a cluster journal generation module may receive a plurality of sets of host address information included in a plurality of host read requests, where the plurality of cluster IDs correspond to the plurality of sets of host address information. In response to receipt of the plurality of sets of host address information, the cluster journal generation module may populate a plurality of cluster journals with the plurality of cluster IDs.

In some embodiments, a front end module may receive a first host read request and a second host read request, where the host address may include a first set of host address information identified in the first host read request, and where the at least one other data set is associated with a second set of host address information identified in the second host read request.

Other embodiments are possible, and each of the embodiments can be used alone or together in combination. Accordingly, various embodiments will now be described with reference to the attached drawings.

Exemplary Embodiments

The following embodiments describe non-volatile memory systems and related methods of identifying associations of data clusters to improve read performance. Before turning to these and other embodiments, the following paragraphs provide a discussion of exemplary non-volatile memory systems and storage modules that can be used with these embodiments. Of course, these are just examples, and other suitable types of non-volatile memory systems and/or storage modules can be used.

FIG. 1A is a block diagram illustrating a non-volatile memory system 100. The non-volatile memory system 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die(s) 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the system 100 may be part of an embedded memory system.

Although in the example illustrated in FIG. 1A, the non-volatile memory system 100 may include a single channel between the controller 102 and the non-volatile memory die(s) 104, the subject matter described herein is not limited to having a single memory channel. For example, in some NAND memory system architectures, 2, 4, 8 or more NAND channels may exist between the controller and the NAND memory die(s) 104, depending on controller capabilities. In any of the embodiments described herein, more than a single channel may exist between the controller and the memory die(s)s 104, even if a single channel is shown in the drawings.

Figure 1B:
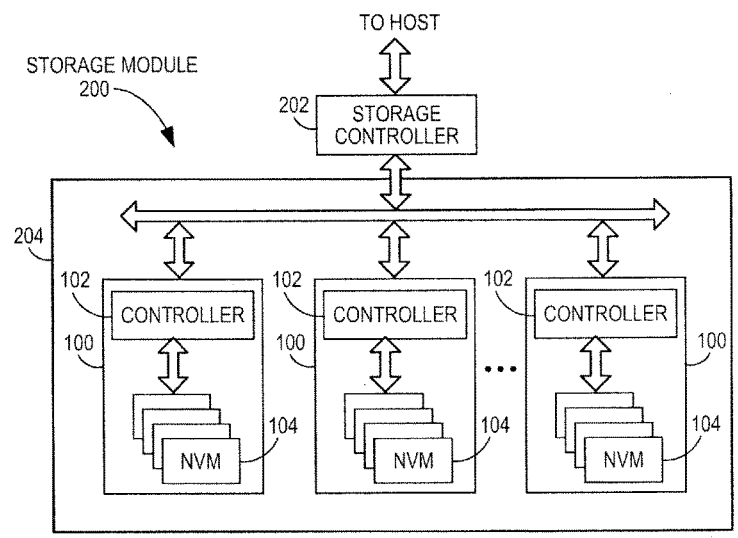
FIG. 1B is a block diagram of a storage module that includes a plurality of non-volatile memory systems.

FIG. 1B illustrates a storage module 200 that includes plural non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
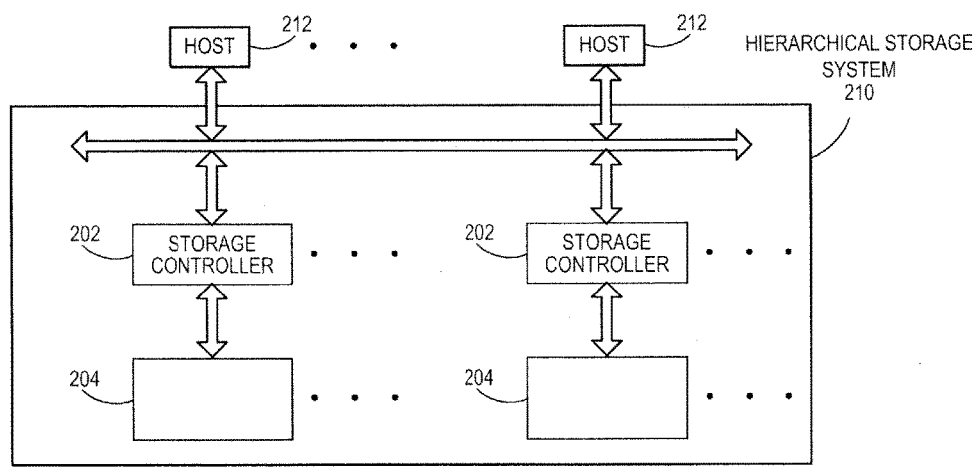
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
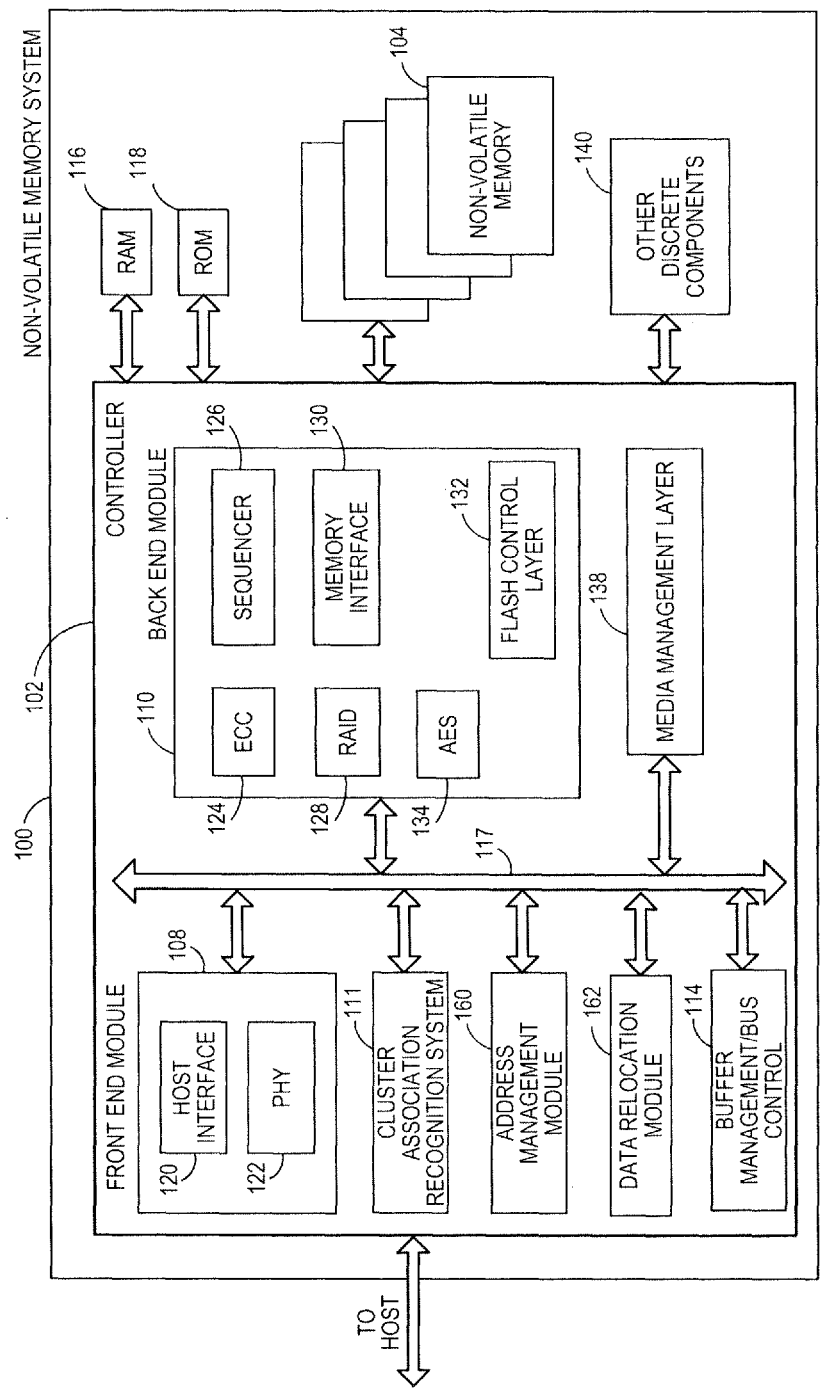
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory 104. The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Additional modules of the non-volatile memory system 100 illustrated in FIG. 2A may include a media management layer 138, which performs wear leveling of memory cells of the non-volatile memory die 104. The non-volatile memory system 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Additional modules of the non-volatile memory system 100 illustrated in FIG. 2A may also include a cluster association recognition system 111, an address management module 160, and a data relocation module 162, as described in further detail below. These modules are shown as separate from the other modules of the non-volatile memory system 100, although in other configurations, one or more of them may be part of any of the other modules.

Figure 2B:
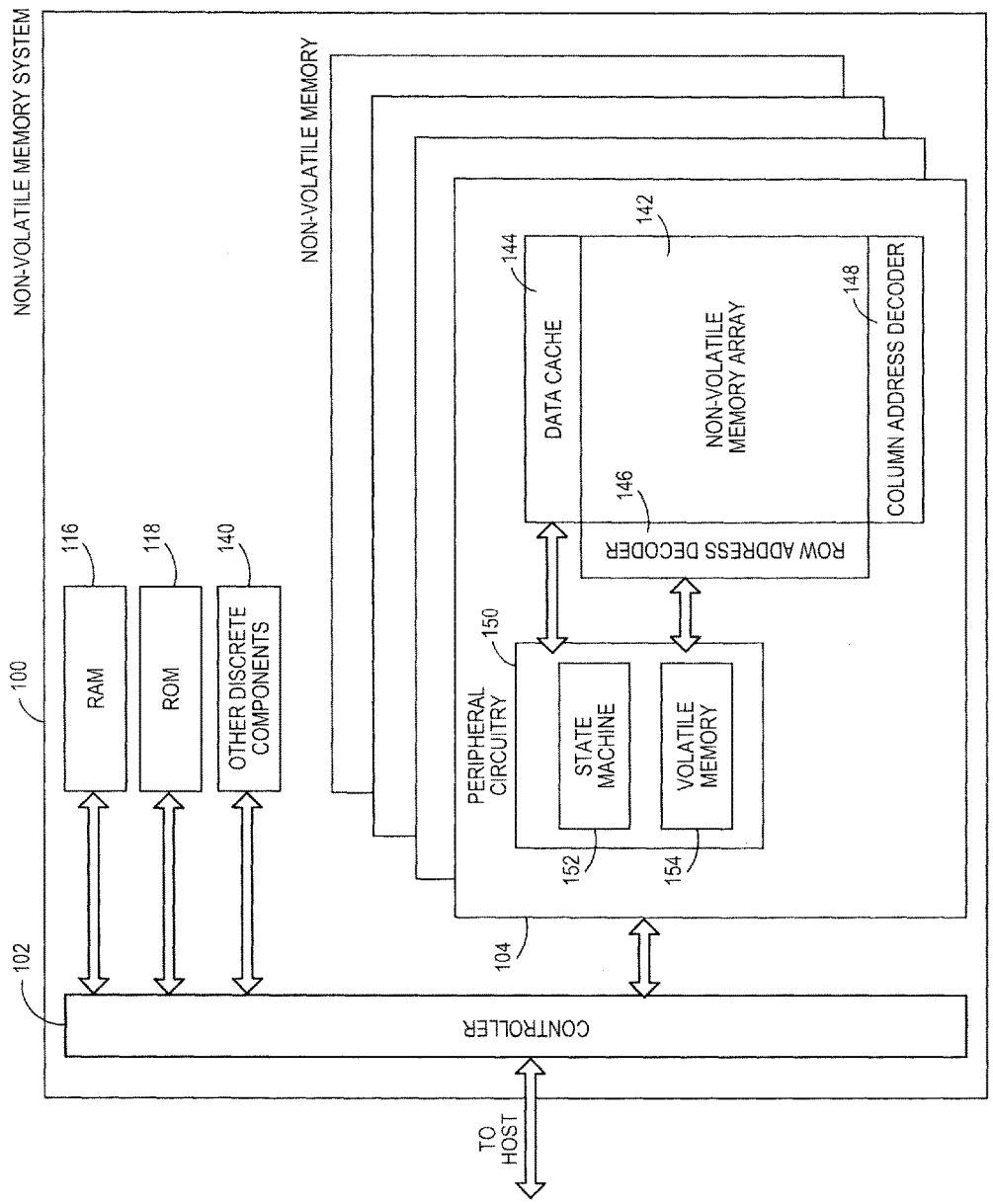
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

Figure 3:
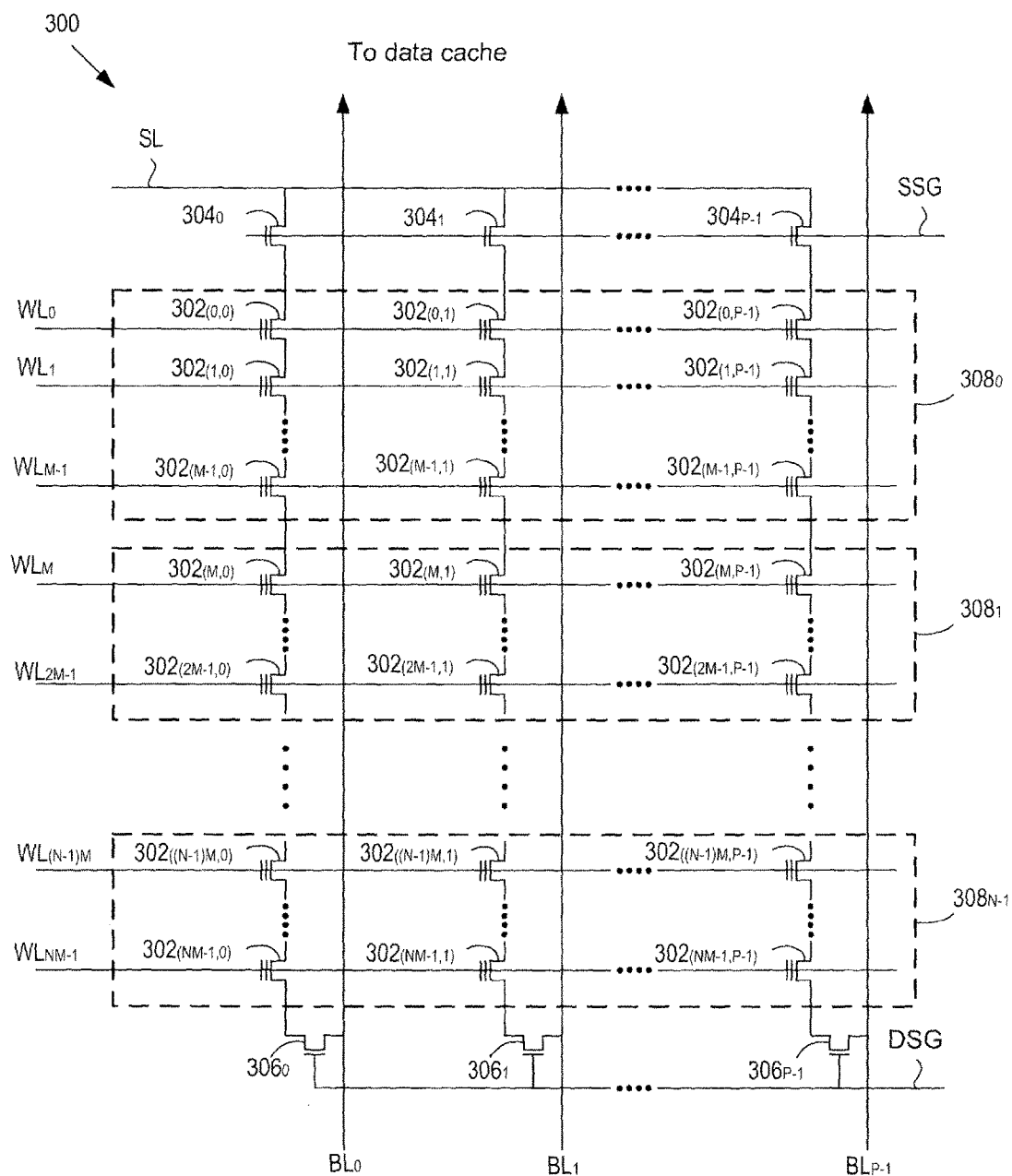
FIG. 3 is a circuit schematic diagram of an exemplary NAND-type flash memory array.

FIG. 3 is a circuit schematic diagram of at least a portion of an exemplary NAND-type flash memory array 300, which may be representative of at least a portion of the memory array 142. The memory array portion 300 may include a P-number of series-connected strings of (N times M) FGTs, each coupled to one of a P-number of bitlines $BL_1$ to $BL_{P-1}$, where N is the number of blocks $308_0$ to $308_{N-1}$ in the memory array 300, and M is the number of pages of FGTs coupled to wordlines WL in each of the N-number of blocks $308_0$ to $308_{N-1}$.

To sense data from the FGTs, a page of FGTs and a corresponding wordline may be selected, and current sensing of bitlines may be employed to determine whether a floating gate of a FGT in the selected page contains charge or not. Current that flows through a string may flow from a source line SL, through the string, to a bitline BL to which the string is coupled. The string may be coupled to the source line SL via a source select transistor, and may be coupled to its associated bitline BL via a drain select transistor. For example, a first string of FGTs $302_{(0,0)}$ to $302_{(NM-1,0)}$ may be coupled to the source line SL via a source select transistor $304_0$ that is connected to the source line SL, and may be coupled to its associated bitline $BL_0$ via a drain select transistor $306_0$. The other strings may be similarly coupled. Switching of source select transistors $304_0$, $304_1$, ..., $304_{P-1}$ may be controlled using a source select gate bias line SSG that supplies a source select gate bias voltage $V_{SSG}$ to turn on an off the source select transistors $304_0$, $304_1$, ..., $304_{P-1}$. Additionally, switching of drain select transistors $306_0$, $306_1$, ..., $306_{P-1}$ may be controlled using a drain select gate bias line DSG that supplies a drain select gate bias voltage $V_{DSG}$ to turn on and off the drain select transistors $306_0$, $306_1$, ..., $306_{P-1}$.

Referring back to FIG. 2B, the non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 152 that provides status information to the controller 102. Other functionality of the state machine 152 is described in further detail below. The peripheral circuitry 150 may also include volatile memory 154. An example configuration of the volatile memory 154 may include latches, although other configurations are possible.

Referring to FIG. 4, the memory array 142 and/or a plurality of memory arrays 142 spanning multiple memory dies 104 may have an organizational arrangement or hierarchy under which memory elements or cells of the memory array 142 and/or multiple memory arrays 142 of multiple memory dies 104 may be organized. The controller 102 may be configured to store and access data in accordance with the organizational arrangement or hierarchy.

FIG. 4 is a block diagram of an example organizational arrangement or hierarchy of a memory array 142 for flash memory. As mentioned, for flash memory, the memory cells may be divided or organized into blocks 402, and each block 402 may further be divided into a number of pages 404. Each block 402 may contain the minimum number of memory elements that may be erased together. In addition, each page 404 may be a unit of sensing in the memory array 142. Each individual page 404 may further be divided into segments or units 406, with each segment or unit 406 containing the fewest number of memory cells that may be written to at one time as a basic programming operation. Data stored in a segment or unit of memory cells—referred to as a flash memory unit (FMU), an ECC page, or a codeword—may contain the amount of data that is written at one time during a basic programming operation and/or the amount of data that can be encoded or decoded by the ECC engine 124 during a single encoding or decoding operation. The pages 404 may be divided into the same number of segments or units. Example numbers of segments or unit may be four or eight, although other numbers are possible. In general, data may be stored in blocks and pages of memory elements non-contiguously (randomly) or contiguously.

In addition, the organizational arrangement or hierarchy may include one or more planes in which each of the blocks 402 may be configured. Generally, a plane includes a "column" of blocks 402, although other configurations may be possible. A single memory array 142 may include a single plane or multiple planes. The example arrangement shown in FIG. 4 includes two planes, Plane 0 and Plane 1. Data stored in different planes may be sensed simultaneously or independently.

Additionally, the organizational arrangement or hierarchy may include metablocks 408 and metapages 410. A metablock address or number identifying a metablock may be mapped to and/or correspond to a logical address (e.g., a logical group number) provided by a host. A metablock 408 and a metapage 410 may span or be distributed across a respective single block and page in a single plane, or alternatively, may span or be distributed across respective multiple blocks and multiple pages across multiple planes. FIG. 4 shows the metablock 408 and the metapage 410 spanning across two planes, Plane 0 and Plane 1. Depending on the organizational arrangement, metablocks 408 and metapages 410 spanning across multiple planes may span across only those planes of a single memory die 104, or alternatively may span across multiple planes located of multiple memory dies 104.

A host and the non-volatile memory system 100 may use different addressing schemes for managing the storage of data. The host may utilize a host addressing scheme, also referred to as a logical addressing scheme. When a host wants to write data to the non-volatile memory system 100, the host may assign a host address or a logical address (also referred to as a logical block address (LBA)) to the data. Similarly, when the host wants to read data from the non-volatile memory system 100, the host may identify the data it wants read by the logical address. The host may utilize a logical addressing scheme in which a host file system maintains a logical address range for all LBAs assigned or recognized by the host. In addition, for some example configurations, the host may address data in units of logical sectors. Accordingly, host read and write requests may be requests to read and write a segment comprising a string of logical sectors of data with contiguous addresses.

In contrast to the host's logical addressing scheme, the non-volatile memory system 100 may store and access data according to a physical addressing scheme that uses physical addresses different from the logical addresses assigned by the host to store and access data. To coordinate the host's logical addressing scheme with the non-volatile memory system's physical addressing scheme, the non-volatile memory system 100 may perform address translation in which the non-volatile memory system 100 translates a logical address included in a host request to a physical address for storage or retrieval of data. For some example implementations, when the non-volatile memory 100 performs an initial address translation, the physical address that the non-volatile memory system 100 determines may identify a metablock, a plurality of metablocks, and/or physical sectors within a metablock, at which the data is stored.

For some example configurations, the logical addresses (LBAs) may be grouped into logical groups (LGs), and the logical groups may be mapped to the metablocks. FIG. 5 shows a schematic diagram of the mapping between logical groups (LG) and metablocks (MB). Each logical group may be mapped to a unique metablock. Accordingly, as shown in FIG. 5, a metablock may have a N-number of physical sectors for storing N-logical sectors of data associated with a logical group. For some example configurations, the logical sectors of data may be stored in the physical sectors in contiguous and sequential logical order 0, 1, . . . N−1. Alternatively, N logical sectors of data may be stored randomly or discontiguously in N physical sectors of a metablock.

In addition, for some example configurations where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 5, a metablock $MB_j$ may store data associated with a logical sector k in its first physical sector 0. When the last logical sector N−1 is reached, the logical sectors may wrap around such that the first logical sector 0 is stored contiguously and sequentially after logical sector 0, and the logical sector k−1 is stored in the last physical sector N−1. A page tag may be used to identify any offset, such as by identifying the starting logical sector address of the data stored in the first physical of the metablock.

In order to keep track of where in the non-volatile memory system 100 data is stored, an address management module 160 of the non-volatile memory system 100 may maintain or manage a directory system that maps relationships or associations between host or logical addresses and physical addresses (e.g., metablock addresses). The directory system may include one or more address data structures (such as tables, listings, logs, or databases as examples) that track and identify the logical-physical address relationships or mappings that the controller 102 may access to determine where in the non-volatile memory system 100 the most recent version of the data is stored.

The address data structures may include a primary address data structure (also referred to as a Group Address Table (GAT)) that provides a primary logical-physical address mapping for logical addresses included in the logical address range recognized by the host. Various configurations of the mapping for the GAT are possible. In one example configuration for flash technology, the GAT keeps track of logical-physical address mapping between logical groups of logical sectors and corresponding metablocks. The GAT includes an entry for each logical group, ordered sequentially according to logical addresses. In addition, the GAT may be organized into a plurality of GAT pages, with each GAT page including entries identifying a metablock address for every logical group. For some example configurations, the address data structures may include at least one secondary address data structure in addition to the GAT. The at least one secondary address data structure may provide logical-physical address mapping for data fragments, may track changes or updates to where data is stored, or some combination thereof. One example secondary address data structure, referred to as GAT Delta, may track changes to entries and/or include a listing of changed entries in the mappings of the GAT. When data is re-written, the new version of the data may be written to another part of the non-volatile memory system 100, such as in an update block. GAT Delta may map data stored in the update blocks with associated logical groups. For some example configurations, GAT Delta may be part of a Master Index Page (MIP) that, in addition to GAT Delta, includes a Free Block List (FBL) and/or the GAT. The Free Block List may be a list that identifies blocks that are available for storage of data (e.g., for allocation as an update block) and that may be later mapped to logical groups. Other secondary address data structures may be possible.

Such primary and secondary address data structures are merely exemplary and other data structures may be possible. In general, the non-volatile memory system 100 may maintain at least one address data structure that associates host logical address information with physical address information.

A host may request the non-volatile memory system 100 to read a collection of different data sets at or around the same time (e.g., within a certain time period depending on host traffic, which may be on the order of less than 10 milliseconds as an example) due to an association among the data sets. As non-limiting examples, data sets in a collection may be associated with each other due to being associated with the same host process (e.g., a boot process), associated with the same host application, or associated with the same user triggered event such as the opening of applications or retrieval of files. Whatever the association may be, whenever the host requests one of the data sets in the collection to be read, the host will request, or at least there is a high likelihood that the host will request, the other data sets in the collection to be read as well.

However, the data sets in a collection may not be stored in the non-volatile memory dies 104 in optimal locations so as to maximize the performance when these data sets are read. Further, when storing the data sets and/or retrieving the data sets upon receiving host requests, the non-volatile memory system may recognize them as individual, unassociated requests for data to be read. As such, any read look-ahead schemes that the non-volatile memory system 100 may have to increase the speed at which data is retrieved may not be used. Various circumstances may cause the non-volatile memory system 100 to not store the data sets in optimal locations and/or fail to recognize them as being frequently read together. Such circumstances may include that the data sets are associated with common application files, such as dynamic-link library (DLL) files, that were stored during installation, the data sets were part of a large sequential software installation but have since been fragmented due to drive wear, the data sets were stored at different times, or the data sets were relatively small in size. Other circumstances may be possible. Whatever the circumstance may be, the association among the different data sets may not be apparent to the non-volatile memory system 100 when receiving a host read request for these data sets. Conversely, if the non-volatile memory system 100 could identify the association among the data sets, the speed at which the non-volatile memory system 100 may respond back to the host may be improved, as described in further detail below.

As previously mentioned with reference to FIG. 2A, the controller 102 may include a cluster association recognition system 111 to identify or recognize associations among data sets. In particular, the cluster association recognition system 111 may recognize associations among clusters of data. As used herein, the term "cluster" may refer to a data set that corresponds to continuous host logical address information. Each cluster may be initially identified by continuous logical address information included in a single host read request or a plurality of consecutively-received host read requests received by the non-volatile memory system 100. The cluster association recognition system 111 may identify each cluster of data by a cluster identification (ID). Each cluster ID may be and/or correspond to a particular set of logical address information. An example set may include a logical group number and an associated length. Each cluster may also have an associated timestamp, which may indicate when the corresponding set of logical address information was received by the non-volatile memory system 100.

FIG. 6 is a block diagram of the cluster association recognition system 111 in further detail. The recognition system 111 may include a root cluster identifier module 602 that is configured to identify or select root clusters. A root cluster may be a source or starting cluster from which the recognition system 111 may identify a cluster association. Each cluster association that the recognition system 111 recognizes may be associated with and/or include a root cluster identified or selected by the root cluster identifier module 602.

As shown in FIG. 6, the root cluster identifier module 602 may be configured to receive logical address information in order to identify a root cluster. In one example configuration, the root cluster identifier module 602 may receive the logical address information from the front end module 108 (FIG. 2A). The front end module 108 may receive host read requests from the host and pass on the logical address information included in the host read requests to the root cluster identifier module 602. The root cluster module 602 may identify different clusters as corresponding to different sets of continuous logical address information received from the front end module 108. In response to receipt of the sets of logical address information, the root cluster identifier module 602 may be configured to select which of the sets of logical address information to use to correspond to a root cluster.

The root cluster identifier module 602 may use one or more criteria to select sets of logical address information. One criterion may be a predetermined threshold number of different sets of logical address information and/or a predetermined threshold number of host read requests. When the root cluster identifier module 602 detects that the predetermined threshold number has been reached, the root cluster identifier module 602 may select a current or next-received set of logical address information and identify the data associated with that set as a root cluster. Another criterion may be a threshold amount of time from when the data associated with a set of logical group information was initially written. For some example configurations, the cluster association recognition system 111 may want to recognize cluster associations for relatively older data. As such, the root cluster identifier module 602 may select a set of logical address information as a root cluster if the data associated with the set was initially written prior to a predetermined date or amount of time from a present time. Another criterion may be that a set of logical address information was not previously used for a root cluster. Various other criteria may be possible.

The root cluster identifier module 602 may use one or a combination of the different criteria to select a set of logical address information for a root cluster. For example, when the root cluster identifier module 602 identifies that the predetermined threshold number of sets of logical address information or host read requests has been reached, the root cluster identifier module 602 may select a current or next-received set of logical address information. The root cluster identifier module 602 may then check to see if it has record of that set having been previously used for a root cluster and if the data associated with that set was written prior to a threshold date or time period. If both criteria are satisfied, then the root cluster identifier module 602 may select that set for identification of a root cluster. If not, then the root cluster identifier module 602 may wait for a next set of logical address information to arrive to identify a root cluster. Various other ways of using the above-mentioned criteria or other criteria to select sets of logical address information for identification of root clusters may be possible. Hereafter, a selected set of logical address information that corresponds to a root cluster may be referred to as a root set of logical address information.

The cluster association recognition system 111 may also include a cluster journal generation module 604 that is configured to generate journals or logs of clusters. A cluster journal may be a data structure that is populated with cluster IDs. As described in further detail below, cluster journal may be used by the cluster association recognition to determine cluster associations.

FIG. 7 is a schematic diagram illustrating an example cluster journal 702 that the cluster journal generation module 604 may be configured to populate with cluster IDs. As shown in FIG. 7, the cluster journal 702 may include a P-number of journal entries 704, including Journal Entry 0 Journal Entry P-1. Each journal entry 704 may be populated with a cluster ID of a cluster in a cluster II) field 706 and an associated time stamp in a timestamp (TS) field 708. The cluster journal 702 may also include a header 710 that includes a cluster journal ID field 712, and a suspend/power-on field 714. The cluster journal ID field 712 may include an ID for the cluster journal. Various formats may be used for the cluster journal ID, such as an alphanumeric format for example. In addition, some formats may use association information as part of the cluster journal ID that identifies a root cluster with which the cluster journal 702 is associated. The suspend/power-on field 714 may include information indicating whether Journal Entry 0 is the first journal entry since a suspend event, Journal Entry 0 is the first journal entry since a power-on event, Journal Entry P-1 is the last entry before a suspend event, Journal Entry P-1 is the last entry before a power-on event, or a combination thereof. A suspend event may be a power transition event initiated by the host for the non-volatile memory system 100 to save power. When the non-volatile memory system 100 receives a suspend command from the host, various components of the non-volatile memory system 100, including one or more components of the controller 102 and/or the non-volatile memory dies 104, may power down in order for the non-volatile memory system 100 to enter into a low power state. A power-on event may also be a host-initiated event that occurs when the host begins supplying power to the non-volatile memory system 100 or when the non-volatile memory system 100 enters back into a higher power state from the low power state while suspended. Additionally, as shown in by arrows 716, the list of entries 704 may be circular, with the last entry, Journal Entry P-1, pointing to the First journal entry, Journal Entry 0. By being circular, the list of entries 704 may be capable of overwriting itself continuously. Also, by being circular, the list of entries 704 may include a desired number of journal entries populated with sets of logical address information received immediately prior to an event of interest, such as receipt of the root set of logical address information as described in further detail below, regardless of when the event of interest occurs or where information associated with the event of interest is populated in the list of entries 704.

The P-number of entries 704 that are populated with cluster IDs may be the same or vary from cluster journal to cluster journal. For some example configurations, the P-number of entries in a cluster journal may depend on whether a suspend or power-on event occurs. In particular, suspend events and/or power-on events may be stopping points for populating current cluster journals and starting points for populating new cluster journals. If operation of the non-volatile memory system 100 is suspended or the non-volatile memory system 100 is powered down, the cluster journal generation module 604 may stop populating a current cluster journal. Once operation of the non-volatile memory system 100 resumes or the non-volatile memory system 100 is again powered up, the cluster journal generation module 604 may start populating a new cluster journal. The cluster journal generation module 604 may also be configured to populate a predetermined maximum number of entries in a single cluster journal. If a suspend or power-on event does not occur and the maximum number of entries is populated, the cluster journal generation module 604 may stop populating the current cluster journal and start populating a new cluster journal.

Referring back to FIG. 6, the cluster journal generation module 604 may receive sets of logical address information, such as from the front end module 108, to populate entries of a cluster journal. For example, the cluster journal generation module 604 may receive a set of logical address information, identify a cluster ID corresponding to that set, and populate an entry in a cluster journal with that cluster ID.

The journal entries may be populated with cluster IDs in an order corresponding to an order in which the corresponding sets of logical address information are received by the cluster journal generation module 604, which in turn may be indicative of and/or correspond to an order in which host read requests including the logical address information are received by the non-volatile memory system 100 from the host. The cluster journal generation module 604 may be configured to populate the journal entries in various ways in order to maintain the order. For some examples, the cluster journal generation module 604 may populate the entries in a "top-down" format such that the lower an entry number or higher up in the entry list a cluster ID is located, the earlier the corresponding set of logical address information was received. Alternatively, the cluster journal generation module 604 may populate the entries in a "push-down" format such that the cluster journal generation module 604 always populates a newest cluster ID into an initial entry of the cluster journal, and the other cluster IDs in the entries are "pushed down" the list accordingly. For this latter configuration, the higher an entry number or further down in the entry list a cluster ID is located, the earlier the corresponding set of logical address information was received. Other ways of populating entries of a cluster journal to maintain the order may be possible.

When the root cluster identifier module 602 identifies a root cluster, the root cluster identifier module 602 may notify the cluster journal generation module 604 of the root cluster, such as by providing a root cluster ID for that root cluster to the cluster journal generation module 604. In response to receipt of the root cluster ID, the cluster journal generation module 604 may create an X-number of cluster journals associated with the root cluster ID, where X may be two or more.

FIG. 8 shows a schematic diagram of an example populated cluster journal 802 associated with a root cluster ID that may be generated by the cluster journal generation module 604. The populated cluster journal 802 may include a journal entry 804 populated with the root cluster ID identifying the root cluster, an M-number of journal 806 entries populated with an M-number of cluster IDs that correspond to a last M-number of sets of logical address information that were received immediately prior to receipt of the root set of logical address information, and an N-number of journal entries 808 populated with an N-number of cluster IDs that correspond to a subsequent N-number of sets of logical address information that were received immediately after or subsequent to receipt of the root set of logical address information. Hereafter, the term "prior set of logical address information" may refer to a set of logical address information received prior to the root set of logical address information, and the term "prior cluster" may refer to a cluster corresponding to a prior set of logical address information. Similarly, the term "subsequent set of logical address information" may refer to a set of logical address information received subsequent to the root set of logical address information, and the term "subsequent cluster" may refer to a cluster corresponding to a subsequent set of logical address information.

Similar to the P-number of total entries that are populated, each of the numbers M and N may be the same or different from cluster journal to cluster journal. In addition, each of the numbers M and N may have maximum limits. If no suspend or power-on events occur while the cluster journal generation module 604 is populating a cluster journal, then the M-number and N-number of prior and subsequent cluster IDs may be equal to their associated maximum limits. However, since suspend and/or power-on events may be stop and starting points for cluster journal creation as previously described, if a suspend or power-on event occurs, one or both of M and N may be lower than their respective maximum limits in a given cluster journal.

A cluster journal 802 associated with a root cluster may be created in various ways. In one example, prior to receipt of the root cluster ID, the cluster journal generation module 604 may be configured to populate journal entries in the cluster journal 802 with cluster IDs corresponding to received sets of logical group information. At this time, the cluster journal that is being populated may not be associated with a root cluster. When the root cluster identifier module 602 notifies the cluster journal generation module 604 of a root cluster, the cluster journal generation module 604 may identify a cluster ID in the cluster journal being populated that matches the root cluster ID provided from the root cluster identifier module 602. In addition, using one or more counters, the cluster journal generation module 604 may be configured to format the cluster journal 802 so that the M-number of prior cluster IDs are populated in the cluster journal 802, and further populate the cluster journal 802 with the N-number of subsequent cluster IDs.

The root cluster ID, the M-number of prior cluster IDs, and the N-number of subsequent cluster IDs may be arranged in journal entries 804, 806, 808 according to the order in which the timestamps identify their corresponding sets of logical address information as being received from the host. In the example cluster journal 802 shown in FIG. 8, the root cluster ID may be included in Journal Entry M. With regard to the prior cluster IDs, the cluster ID included in Journal Entry M−1 may correspond to the set of logical address information identified as being received immediately prior to receipt of the root set of logical address information, the cluster ID included in Journal Entry M−2 may correspond to the set of logical address information identified as being received two sets of logical address information prior to receipt of the root set of logical address information, and so on. Similarly, the cluster ID included in journal entry M+1 may correspond to the set of logical address information identified as being received immediately after receipt of the root set of logical address information, the cluster ID included in Journal Entry M+2 may correspond to the set of logical address information identified as being received two sets of logical address information after receipt of the root set of logical address information, and so on.

As mentioned, the cluster association recognition system 111 may use cluster journals to identify associations among clusters. When a cluster journal is populated, it may include information that may not be used by the cluster association recognition system 111 to identify the associations. As described in further detail below, the cluster association recognition system 111 may include one or more filtering modules configured to filter out or remove such undesired information. However, when initially generated by the cluster journal generation module 604, a cluster journal may include the undesired information. As such, a cluster journal in its initial state may be referred to as an unfiltered cluster journal.

As shown in FIG. 6, when the cluster journal generation module 604 is finished generating a cluster journal, the cluster journal generation module 604 may be configured to store the cluster journal as an unfiltered cluster journal in an unfiltered cluster journal database 606. When the cluster journal generation module 604 receives notification of a root cluster from the root cluster identifier module 602, the cluster journal generation module 604 may be configured to generate an X-number of cluster journals associated with that root cluster and store them as unfiltered cluster journals in the unfiltered cluster journal database 606.

In further detail, upon notification of a root cluster, the cluster journal generation module 604 may generate an initial cluster journal associated with the root cluster as described, and thereafter may continue to generate further cluster journals associated with the root cluster until it has generated and stored the X-number of cluster journals associated with the root cluster. To generate the further cluster journals, the cluster journal generation module 604 may continue to receive sets of logical address information and retain at least an M-number of sets so that it can include those sets in a cluster journal in the event that it identifies a root set. When the cluster journal generation module 604 identifies a received set of logical address information as a root set, the cluster journal generation module 604 may create another populated cluster journal associated with the root cluster, such as in the form of the populated cluster journal 802 of FIG. 8, as previously described. The cluster journal generation module 604 may continue to generate cluster journals associated with the root cluster and store them in the unfiltered cluster journal database 606 until it has generated and stored the X-number of cluster journals. Hereafter, an X-number of cluster journals associated with a root cluster may be referred to as a cluster journal compilation.

The cluster journal generation module 604 may be configured to generate cluster journals for different root clusters, either at different times or simultaneously. In order to keep track of which cluster journals are associated with which root clusters, the cluster journal generation module 604 may be configured to maintain a journal index 608 that associates journal IDs with root clusters. FIG. 6 shows, as an example, the index 608 identifying a Cluster Journal 1 being associated with a Root Cluster B, and a Cluster Journal 2 being associated with a Root Cluster X. In other configurations, if the cluster journal IDs themselves include association information as previously described, then a journal index 608 may not be needed.

After a cluster journal compilation is generated and stored in the unfiltered cluster journal database 606, the compilation may be filtered by a first-stage filtering module 610 and possibly by a second-stage filtering module 612 to determine whether there are any cluster associations that are associated with the root cluster. As mentioned, filtering may be performed to remove undesired information in the cluster journal compilation before cluster associations are identified. One set of undesired information may be the suspend and/or power-on information included in the header. Another set of undesired information may be timestamp information, including timestamp information indicating idle periods where the non-volatile memory system 100 did not receive any host read requests. A third set of undesired information may be cluster IDs that are identified in the compilation less than or equal to a predetermined threshold number of times, referred to herein as a threshold cluster ID count. Cluster IDs that are identified as being populated less than or equal to the threshold cluster ID count may be considered as being cluster IDs for unassociated clusters since their corresponding sets of logical address information were sent too infrequently around the times that the root sets of logical address information were sent from the host to be part of any cluster association.

The cluster association recognition system 111 may further include a first stage filter module 610 that is configured to retrieve an unfiltered cluster journal compilation stored in the unfiltered cluster journal database 606 and remove undesired information from the unfiltered cluster journal compilation. To do so, the first stage filter module 610 may include a frequency counter 612 that analyzes or sifts through the cluster journals of a retrieved unfiltered compilation and counts the number of times each cluster ID is populated in the cluster journals of the compilation. After the frequency counter 612 is finished counting, the frequency counter 612 may remove from the compilation those cluster IDs occurring less than or equal to the threshold cluster ID count.

In performing the frequency counting and subsequent removal, suspend/power-on information of the header, may be removed since that information may not be needed to identify cluster associations. Timestamp information associated with the cluster IDs may also be removed. In addition, in some implementations, if relatively long idle periods occurred when populating entries in a cluster journal, as indicated by their associated time stamps, the entries populated before and after the idle periods may be spaced apart or separated by empty periods or entries in the cluster journal. The frequency counting, and the first stage filtering generally, may truncate these cluster journals by removing the empty periods or entries. The cluster journal compilation after it has been filtered by the first stage filter module 610 may be referred to as an initially filtered cluster journal compilation.

Figure 9:
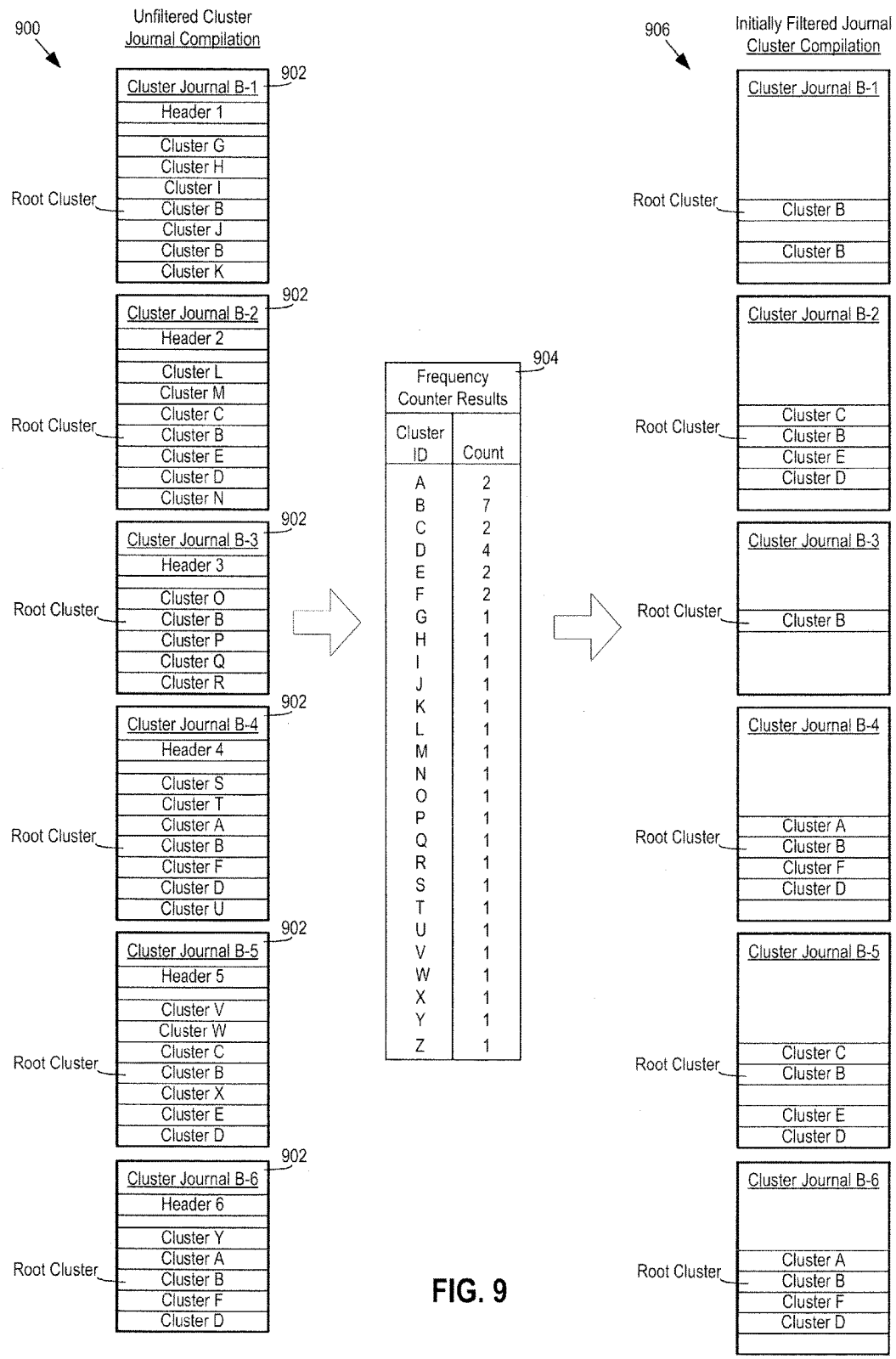
FIG. 9 is a schematic diagram of an example unfiltered cluster journal compilation and a corresponding initially filtered cluster journal compilation resulting from frequency counting.

An example of the first-stage filtering is shown and described with reference to FIG. 9. FIG. 9 shows an unfiltered cluster journal compilation 900 for a Root Cluster B. In the example, the X-number of cluster journals generated for the compilation is six. Accordingly, the cluster journal compilation includes six cluster journals 902, including Cluster Journal B-1 through B-6, each identifying the Root Cluster B. Also, in the example, the maximum limits for the M-number of prior clusters and the N-number of subsequent clusters may each be three, although the maximum limits for M and N may be different in other examples. For example, in other examples, maximum limits for M and N may be each be thirty-two, or alternatively, one maximum limit may be thirty-one and the other may be thirty-two, so that a cluster journal has a maximum number of sixty-four entries (when factoring in the entry for the root cluster). Various maximum limits for M and N may be possible.

Noted in the example is that suspend and/or power-on events did not occur when the cluster journal generation module 604 generated Cluster Journals B-1, B-2, B-4, and B-5, and so each of these cluster journals may be populated with an M-number of prior cluster IDs and an N-number of subsequent cluster IDs equal to their maximum limits of three. However, Cluster Journal B-3 includes only a single prior cluster ID—Cluster O—indicating that a suspend or power-on event occurred prior to generation of Cluster Journal B-2, and a single set of logical address information corresponding to Cluster O was received prior to receipt of the root set of logical address information corresponding to Root Cluster B. Similarly, Cluster Journal B-6 includes only two prior cluster IDs—Cluster Y and Cluster A indicating that a suspend or power-on event occurred prior to generation of Cluster Journal B-6, and only two sets of logical address information corresponding to Cluster Y and Cluster A were received prior to receipt of the root set of logical address information corresponding to Root Cluster B. In addition, Cluster B-6 includes only two subsequent cluster IDs—Cluster F and Cluster D—indicating that another suspend or power-on event occurred prior to the non-volatile memory system 100 receiving a third set of logical address information after receipt of the root set of logical address information.

In the example shown in FIG. 9, the threshold cluster ID count is one, and so any cluster ID populated only once in the compilation is removed due to the frequency counting. Results of the frequency counting are shown in chart 904. As shown, cluster IDs A through F were identified by the frequency counting as being populated in the compilation more than once (i.e., more than the threshold cluster ID count), while the other Cluster IDs G through Z were identified as being populated only once (i.e., equal to the threshold cluster ID count). FIG. 9 further shows an initially filtered journal cluster compilation 906 following the frequency counting. The initially filtered compilation does not include the suspend/power-on information of the header. Although not shown, in some configurations, all header information may not be completely removed, and journal IDs may kept so that downstream filtering can determine which remaining cluster IDs are populated in which cluster journals, as described in further detail below. Also, as shown in FIG. 9, Cluster IDs G through 7 may be removed from the cluster journals since they were each populated only once. FIG. 9 also shows that the cluster IDs remaining in the initially filtered cluster journals may maintain their respective positions in the cluster journals, at least relative to the other remaining cluster IDs in the cluster journals. Also, although not shown in FIG. 9, in some instances, filtering performed during the first stage may not remove all unassociated cluster IDs and/or some empty space or entries indicative of idle periods may remain. These unassociated cluster ID and/or empty periods/entries may be removed during the second filtering stage.

Referring back to FIG. 6, after the frequency counter 612 counts the cluster IDs and removes information in the compilation other than the cluster IDs populated in the compilation more than the threshold cluster ID count, the first stage filter module 610 may send the initially filtered cluster journal compilation to a second stage filter module 614. The second stage filter module 614 may be configured to identify cluster associations, if any, based on the initially filtered cluster journal compilation. In particular, using the cluster IDs identified in the initially filtered cluster journal compilation, the second stage filter module 614 may be configured to identify sequences of cluster IDs occurring more than a predetermined threshold number of times, herein referred to as a threshold sequence count. A sequence of cluster IDs may include a root cluster ID and at least one other cluster ID. If a sequence is identified, then cluster IDs included in the sequence may be considered associated with each other. In other words, each cluster ID sequence may represent a cluster association and/or identify cluster IDs for clusters of a cluster association. The process used by the second stage filter module 614 to determine the sequences may be referred to as a crawling process in which the second stage filter module 614, for each cluster journal, starts with the journal entry that includes the root cluster ID, and "crawls" through the entries that include the prior clusters and entries that include subsequent clusters to identify sequences of clusters occurring more than the threshold sequence count.

Figure 10:
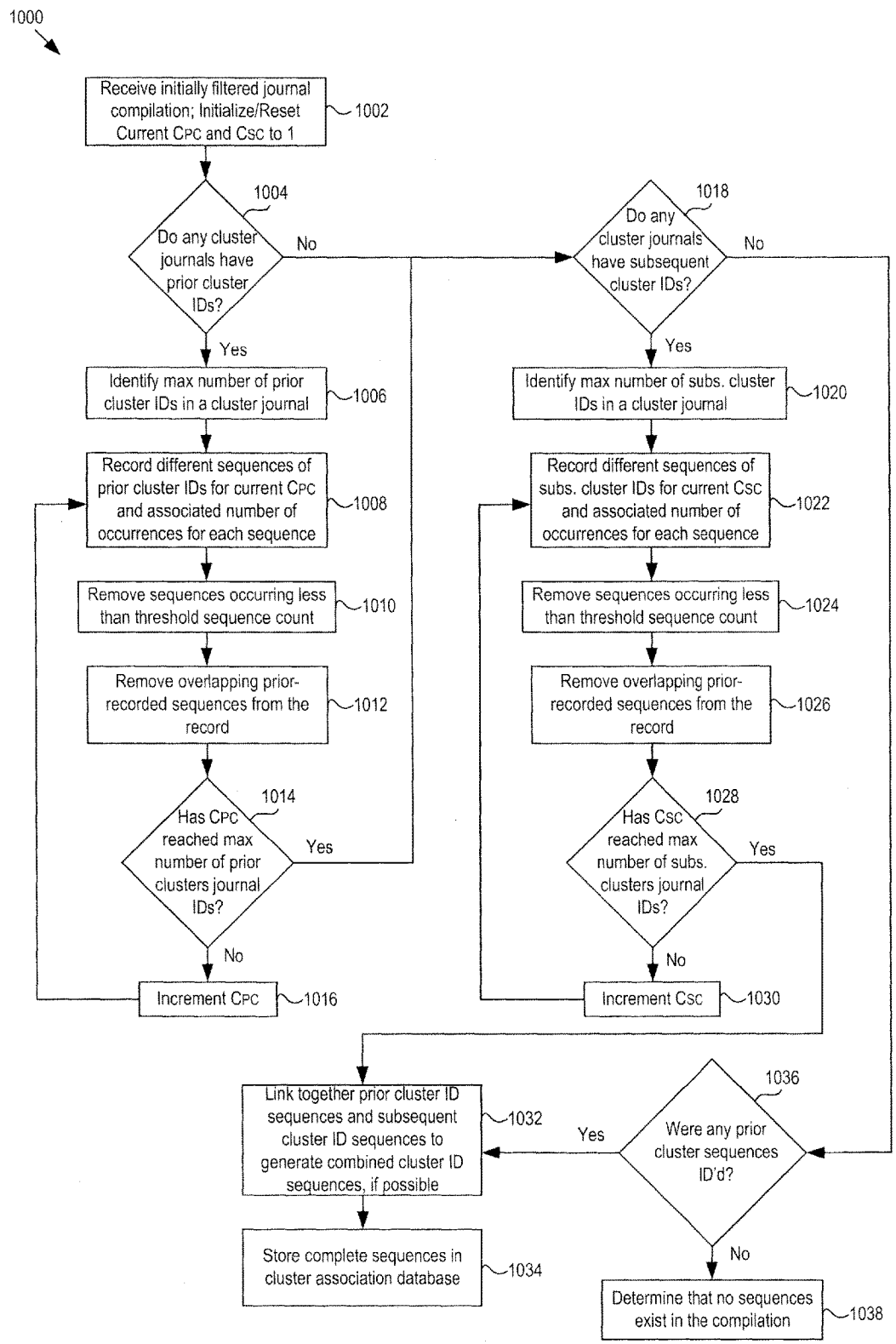
FIG. 10 is a flow chart of an example method of identifying sequences of clusters.

FIG. 10 shows a flow chart of an example method 1000 that may be performed by the second stage filter module 614 to identify sequences of cluster IDs in an initially filtered cluster journal compilation that occur greater than a threshold sequence count. To provide further illustration using a specific example, the method 1000 is also described with reference to FIG. 11, which is a schematic diagram illustrating how the second stage filter module 614 may perform the method 1000 to identify one or more sequences of cluster IDs in the initially filtered cluster journal compilation 906 described with reference to FIG. 9.

At block 1002, the second stage filter module 614 may receive an initially filtered cluster journal compilation. Also at block 1002, the second stage filter module 614 may initialize or reset a current prior cluster count $C_{PC}$ and a current subsequent cluster count $C_{SC}$ to one. The current prior cluster count $C_{PC}$ and the current subsequent cluster count $C_{SC}$ may each indicate how many respective prior clusters or subsequent clusters from the root cluster to use to determine clusters. As described in further detail below, the sequences of cluster IDs may be determined by first identifying prior sequences of prior cluster IDs and subsequent sequences of subsequent IDs, and then combining the prior and subsequent sequences for those prior and subsequent sequences with matching associating cluster journal IDs. The current prior and subsequent cluster counts $C_{PC}$, $C_{SC}$ may be initially set or reset to one so that sequences start small and the increase for those sequences that occur above the sequence threshold count.

Figure 11:
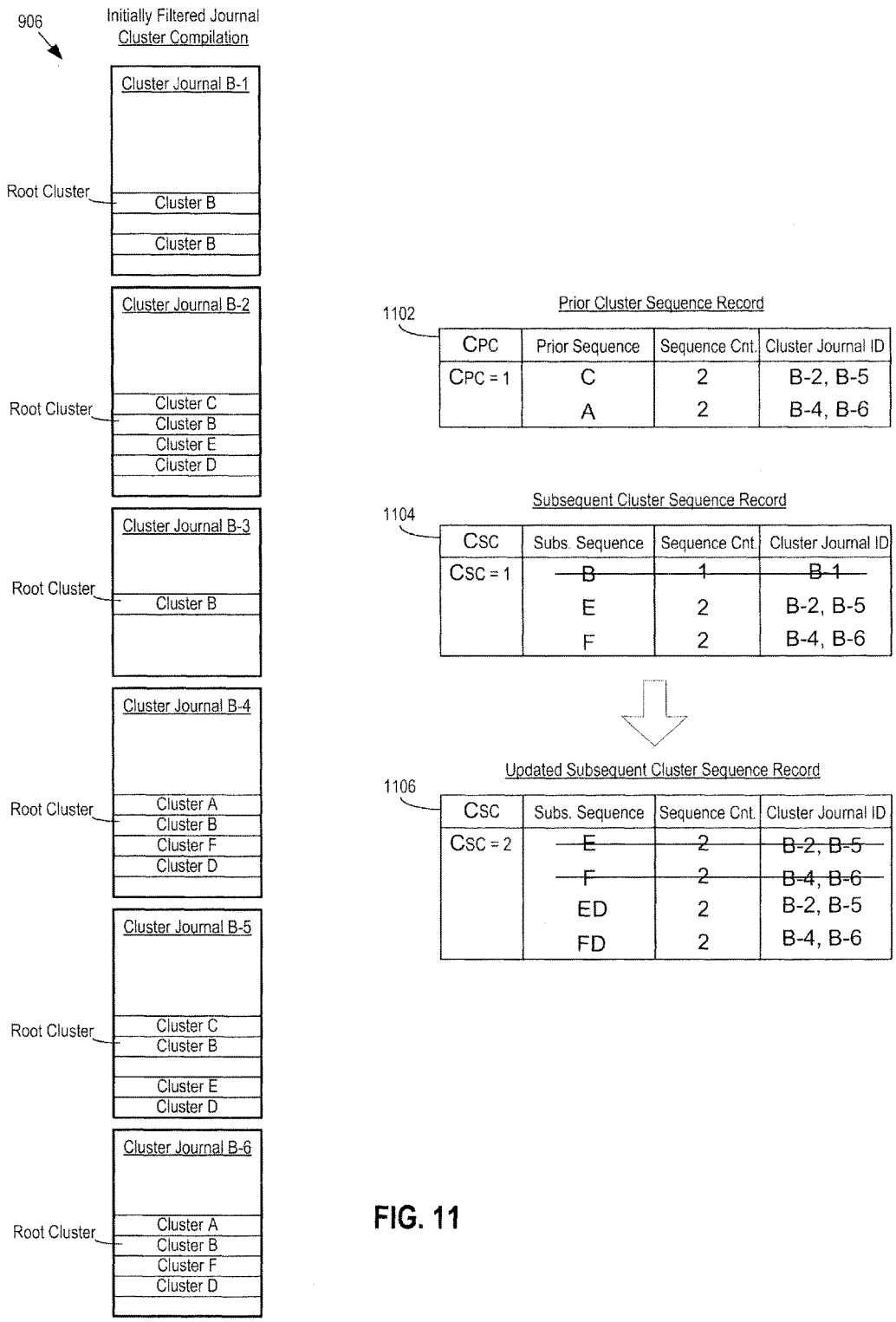
FIG. 11 is a schematic diagram of cluster sequences in the initially filtered cluster journal compilation being identified using the example method of FIG. 10.

At block 1004, the second stage filter module 614 may determine whether any cluster journals in the compilation include any prior cluster IDs. If so, then the method 1000 may proceed to block 1006, where the second stage filter module 614 may identify a maximum number of prior cluster IDs in a single cluster journal. Referring to FIG. 11, the second stage filter module 614 may determine that at least one cluster journal in the compilation includes at least one prior cluster ID. In addition, the second stage filter module 614 may determine that the maximum number of prior cluster IDs in a single cluster journal is one. In particular, Cluster Journals B-1 and B-3 do not have any prior cluster IDs, and Cluster Journals B-2, B-4, B-5, and B-6 each include one prior cluster ID.

At block 1008, the second stage filter module 614 may record different sequences of prior cluster IDs for the current prior cluster count $C_{PC}$. Initially, the current prior cluster count $C_{PC}$ is one, and so the second stage filter module 614 may look to only the prior cluster IDs that are immediately prior the root cluster ID. In FIG. 11, the prior cluster ID immediately prior to the root cluster ID in Cluster Journal B-2 is Cluster C, the prior cluster ID immediately prior to the root cluster ID in Cluster Journal B-4 is Cluster A, the prior cluster ID immediately prior to the root cluster ID in Cluster Journal B-5 is Cluster C, and the prior cluster ID immediately prior to the root cluster ID in Cluster Journal B-6 is Cluster A.

FIG. 11 shows an example record 1102 that the second Filter module 614 may create at block 1008 when the current prior cluster count $C_{PC}$ is one. The example record 1102 identifies that the current prior cluster count $C_{PC}$ is one, that the prior sequences identified for the current prior cluster count $C_{PC}$ of one include a first prior sequence C and a second prior sequence A. The record 1102 further identifies that the first prior sequence C occurred twice, once in Cluster Journal B-2 and another time in Cluster Journal B-5. The record 1102 also identifies that the second prior sequence A occurred twice, once in Cluster Journal B-4 and another time in Cluster Journal B-6.

At block 1010, the second stage filter module 614 may remove from the record prior sequences occurring less than the threshold sequence count. In the example shown in FIG. 11, the threshold sequence count may be one. Accordingly, the first prior sequence C and the second prior sequence A may both be kept in the record 1102. At block 1012, the second stage filter 614 may remove any previously-recorded prior sequences that overlap with prior sequences associated with the same cluster journal ID. In FIG. 11, since the current prior cluster count $C_{PC}$ is one, then no prior sequence were previously recorded.

At block 1014, the second stage filter module 614 may determine whether the current prior cluster count $C_{PC}$ is equal to or has reached the maximum number of prior cluster IDs in a single cluster journal. If not, then at block 1016, the second stage filter module 614 may increase the current prior cluster count $C_{PC}$ by one. The method 1000 may then proceed back to block 1008, where the second stage filter may record different sequences of prior cluster IDs for the newly-incremented current prior cluster count $C_{PC}$. Alternatively, at block 1014, if the current prior cluster count $C_{PC}$ has reached the maximum number of prior cluster IDs, then the second stage filter module 614 may be finished determining prior sequences and the method 1000 may proceed to block 1018 to determine subsequent sequences. In the example in FIG. 11, the second stage filter module 614 determined the maximum number of prior clusters ID as being one, and so the second stage filter module 614 may not increment the current prior cluster count $C_{PC}$ and determine that it is finished identifying prior sequences.

At block 1018, the second stage filter module 614 may determine whether any cluster journals in the compilation include any subsequent cluster IDs. Referring back to block 1004, if by chance none of the cluster journals in the compilation include a prior cluster ID, then the method may proceed directly to block 1018. If at least one of the cluster journals includes at least one subsequent cluster ID, then at block 1020, the second stage filter module 614 may identify a maximum number of subsequent cluster IDs in a single cluster journal. Referring to FIG. 11, the second stage filter module 614 may determine that at least one cluster journal in the compilation includes at least one subsequent cluster ID. In addition, the second stage filter module 614 may determine that the maximum number of subsequent cluster IDs in a single cluster journal is two. In particular, Cluster Journal B-3 does not include any subsequent cluster IDs, Cluster Journal B-1 includes only one subsequent cluster ID, and Cluster Journals B-2, B-4, B-5, and B-6 each include two subsequent cluster IDs.

At block 1022, the second stage filter module 614 may record different sequences of subsequent cluster IDs for the current subsequent cluster count $C_{SC}$. Initially, the current subsequent cluster count $C_{SC}$ is one, and so the second stage filter module 614 may look to only the subsequent cluster IDs that are immediately subsequent to the root cluster ID. In FIG. 11, the subsequent cluster ID immediately subsequent to the root cluster ID in Cluster Journal B-1 is again Root Cluster B, the subsequent cluster ID immediately subsequent to the root cluster ID in Cluster Journal B-2 is Cluster E, the subsequent cluster ID immediately subsequent to the root cluster ID in Cluster Journal B-4 is Cluster F, the subsequent cluster ID immediately subsequent to the root cluster ID in Cluster Journal B-5 is Cluster F, and the subsequent cluster ID immediately subsequent to the root cluster ID in Cluster Journal B-6 is Cluster F.

FIG. 11 shows an example record 1104 that the second filter module 614 may create at block 1008 during when the current subsequent cluster count $C_{SC}$ is one. The example record 1104 identifies that the current subsequent cluster count $C_{SC}$ is one, that the subsequent sequences identified for the current subsequent cluster count $C_{SC}$ of one include a first subsequent sequence B, a second subsequent sequence E, and a third subsequent sequence F. The record 1104 further identifies that the first subsequent sequence B occurred once in Cluster Journal B-1, the second subsequent sequence E occurred twice, once in Cluster Journal B-2 and another time in Cluster Journal B-5, and that the third subsequent sequence F occurred twice, once in Cluster Journal B-4 and another time in Cluster Journal B-6.

At block 1024, the second stage filter module 614 may remove from the record 1104 subsequent sequences occurring less than the threshold sequence count. In the example shown in FIG. 11, the threshold sequence count may be one. Accordingly, since the first subsequent sequence B occurred only once, then the second stage filter module 614 may remove the first subsequent sequence B from the record 1104. This is shown by the strikethrough in the record 1104. However, the second subsequent sequence E and the third subsequent sequence F may both be kept in the record 1104 since they each were identified twice in the compilation. At block 1026, the second stage filter 614 may remove any previously-recorded subsequent sequences that overlap with subsequent sequences associated with the same cluster journal ID. In FIG. 11, since the current subsequent cluster count $C_{SC}$ is one, then no subsequent sequences were previously recorded.

At block 1028, the second stage filter module 614 may determine whether the current subsequent cluster count $C_{SC}$ is equal to or has reached the maximum number of subsequent cluster IDs in a single cluster journal. If not, then at block 1030, the second stage filter module 614 may increase the current subsequent cluster count $C_{SC}$ by one. The method 1000 may then proceed back to block 1022, where the second stage filter may record different sequences of subsequent cluster IDs for the newly-incremented current subsequent cluster count $C_{SC}$. Alternatively, at block 1028, if the current subsequent cluster count $C_{SC}$ has reached the maximum number of subsequent cluster IDs, then the second stage filter module 614 may be finished determining subsequent sequences.

In the example in FIG. 11, the second stage filter module 614 determined the maximum number of prior clusters ID to be two, and so the second stage filter module 614 may increment the current subsequent cluster count $C_{SC}$ from one to two. The second stage filter 614 may then update the record 1104 to generate an updated record 1106 by recording different subsequent sequences for a current subsequent cluster count $C_{SC}$ of two. With a current subsequent count of two, the second stage filter module 614 may look, in each of the cluster journals, to the two cluster IDs that are identified immediately after the root cluster ID to identify the subsequent sequences. The second stage filter module 614 may identify that Cluster Journal B-2 includes a subsequent sequence ED, Cluster Journal B-4 includes a subsequent sequence ED, Cluster Journal B-5 includes the subsequent sequence ED, and Cluster Journal B-6 includes the subsequent sequence FD. Accordingly, the updated chart 1106 identifies the subsequent sequences ED and FD for a current subsequent cluster count $C_{SC}$ of two. The updated chart 1106 further identifies subsequent sequence ED occurring twice, and being included in Cluster Journals B-2 and B-5. The updated chart 1106 also identifies subsequent sequence FD occurring twice, and being included in Cluster Journals B-4 and B-6.

In addition, since the subsequent sequences ED and FD each occur twice—i.e., greater than the threshold subsequent count—they may be kept in the updated record 1106. Further, since the previously-recorded sequences E and F overlap the newly-recorded sequences ED and FD (i.e., because the cluster IDs included in the previously-recorded sequences are also included in the newly-recorded sequences), then they may be removed from the updated chart 1106, as shown by the strikethroughs in the updated chart 1106. The second stage filter module 614 may then determine that the current subsequent cluster count $C_{SC}$ has reached the maximum number of two and as such, that it is finished determining the subsequent sequences.

Referring back to block 1028, if the second stage filter module 614 determines that the current subsequent cluster count $C_{SC}$ has reached the maximum number of subsequent cluster IDs, then the method 1000 may proceed to block 1032. At block 1032, the second stage filter module 614 may combine or link together the prior and subsequent sequences, where possible, to generate combined or complete sequences. A prior sequence and a subsequent sequence may be combined together if they are associated with the same cluster journal IDs—i.e., the cluster IDs included in those sequences are in the same cluster journal. Conversely, prior and subsequent sequences that do not have a respective subsequent or prior sequence to be combined with may be left uncombined. Referring to FIG. 11, the prior sequence C and the subsequent sequence ED may be combined together since they are both associated with Cluster Journals B-2 and B-5. Similarly, the prior sequence A and the subsequent sequence FD may be combined together since they are both associated with Cluster Journals B-4 and B-6.

In addition to combining or linking together the prior and subsequent sequences where possible, the second stage filter module 614 may also add the root cluster ID to each of the sequences to complete the sequence determination. Referring to the example in FIG. 11, a first complete sequence may be sequence CBED, and a second complete sequence may be ABFD. When the second stage filter module 614 is finished determining the complete sequence(s) associated with the root cluster, then at block 1034, the second stage filter module 614 may store the complete sequence(s) in a cluster association database 616 (see also FIG. 6).

Referring back to block 1018, if the initially filtered cluster journals do not have any subsequent cluster IDs, then the method 1000 may proceed to block 1036, where the second stage filter module 614 may determine whether any prior cluster sequences were identified. If so, then the method 1000 may proceed to block 1032, where the second stage filter may identify the prior cluster sequences as complete sequences. Alternatively, if at block 1036, the second stage filter module 614 did not identify any prior cluster sequences, then the method 1000 may proceed to block 1038, where the second stage filter module 614 may determine that the cluster journal compilation does not include any cluster sequences.

Other ways of determining complete cluster sequences may be possible. In one example, the second stage filter module 614 may search for subsequent sequences and prior sequences in the reverse order from that described in FIG. 10. That is, the second stage filter module 614 may search for subsequent sequences first and prior sequences second. Other ways may be possible.

Figure 12:
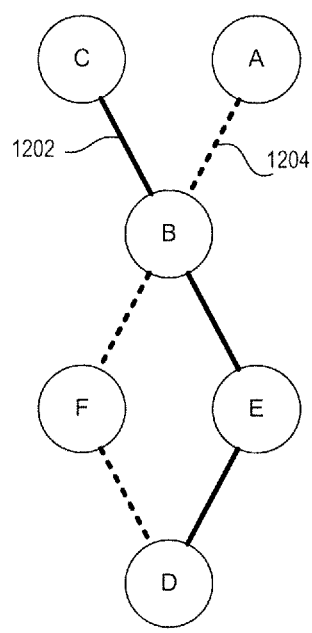
FIG. 12 is a schematic diagram illustrating cluster strings corresponding to the cluster sequences identified in FIG. 11.

As mentioned, a complete sequence may be and/or represent a cluster association. Accordingly, the complete sequence(s) may be stored in the cluster association database 616 such that each sequence identifies their respective clusters as being associated with each other. The cluster associations among clusters in a sequence may be identified as a string of cluster IDs in the cluster association database 1616. FIG. 12 shows a schematic diagram of two cluster strings, including a first string 1202 (denoted by the solid line) and a second string 1204 (denoted by the dotted line), corresponding to the complete cluster sequences CBED and ABFD, respectively. Noted in the example is that Root Cluster B is part of both the first string 1202 and the second string 1204, since both complete sequences were determined for that root cluster. Additionally, Cluster D is also part or each complete sequence, and so is connected to both the first string 1202 and the second string 1204 in FIG. 12.

In addition, as previously mentioned, clusters may be determined to be part of the same cluster association because the cluster association recognition system 111 has identified that the host tends to request that these clusters be read at or around the same time. Identifying cluster associations may then increase read performance since the non-volatile memory system 100 may be able to predict ahead of time that the host will request a certain collection of data sets to be read upon receipt of a request to read one data set in the collection.

Figure 13:
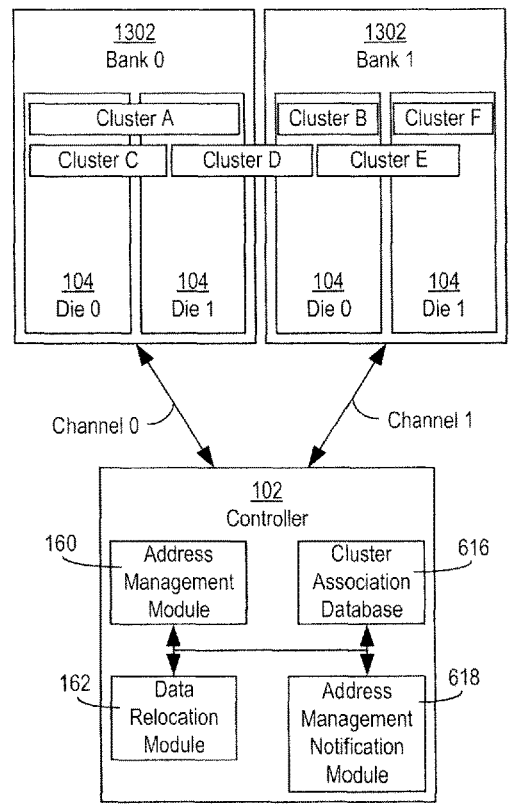
FIG. 13 is a block diagram of non-volatile memory dies configured in multiple banks and data sets associated with the cluster sequences identified in FIG. 11 being stored in the dies.

One way to increase performance may be to store data sets of an associated cluster in the non-volatile memory die(s) 104 in a way such that as many of the data sets as possible may be transferred from the non-volatile memory die(s) 104 to the controller 102 in parallel. FIG. 13 shows a block diagram of an example configuration of the non-volatile memory dies 104 and the controller 102 of the non-volatile memory system 100 of FIG. 2A storing data sets associated with Clusters A, B, C, D, E, and F. As previously described, the controller 102 may communicate with the non-volatile memory dies 104 using a plurality of memory channels. Which memory channel that the controller 102 uses to communicate with a particular die may depend on the bank in which that memory die 104 is configured.

In further detail, the controller 102 may use the same channel to communicate with memory dies 104 configured in the same bank, and may use different channels to communicate with memory dies 104 configured in different banks. Each bank may include one or more memory dies. The example configuration shown in FIG. 13 includes two banks, Bank 0 and Bank 1, with each bank including two memory dies 104, namely a first die, Die 0 and a second die, Die 1. The controller 102 may use a first channel, Channel 0, to communicate with the memory dies 104 in the first bank, Bank 0. In addition, the controller 102 may use a second channel, Channel 1, to communicate with the memory dies 104 in the second bank, Bank 1. Data may be transferred from the memory dies 104 to the controller 102 in parallel if both of the channels, Channel 0 and Channel 1, can be used.

As shown in FIG. 13, the controller 102 may include an address management module 160 that is configured to manage where data associated with host logical addresses is stored in the non-volatile memory dies 104. In doing so, the address management module 160 may associate the logical addresses with physical addresses identifying where the data is stored in the non-volatile memory dies 104. To improve read performance, the address management module 160 may be configured to use sequence information stored in the cluster association database 616 to rearrange where data sets associated with a cluster sequence are stored. In particular, the address management module 160 may be configured to store data sets associated with cluster sequences in such a way as to maximize the number of data sets associated with a cluster sequence that may be transferred in parallel to the controller 102 across the plurality of memory channels.

Using the above example to illustrate, the second stage filter module 616 identified two cluster sequences: CBED and ABFD. The address management module 160 may be configured to arrange data associated with Clusters A, B, C, D, E, and F in such a way as to maximize the number of data sets associated with each of these cluster sequences that can be transferred in parallel across Channel 0 and Channel 1 to the controller 102. In particular, the address management module 160 may determine physical addresses for the data sets in each of the cluster sequences CBED and ABFD so that the data sets are stored in memory dies configured in as many different banks as possible.

FIG. 13 shows Cluster A data stored in memory dies 104 of Bank 0, and Cluster B data and Cluster F data stored in memory dies 104 of Bank 1. Additionally, Cluster C data is stored in memory dies 104 of Bank 0, Cluster E data is stored in memory dies 104 of Bank 1, and Cluster D data is stored in memory dies across both Bank 0 and Bank 1. Since data associated with Clusters A, B, F, and D are part of the same cluster association, then if the non-volatile memory system 100 receives a host read request that requests data associated with Cluster A to be read, there may be a high likelihood that the host will request or has also requested data associated with Clusters B, F, and D to be read as well. Under the storage arrangement shown in FIG. 13, the controller 102 may be configured to receive data associated with Cluster A in parallel with data associated with Cluster B or data associated with Cluster F. Conversely, if data associated with Cluster 13 and/or Cluster F were also stored in a die in Bank 0, then use of both Channel 0 and Channel 1 to transfer the data associated with Clusters A, B, and F may not be possible. Accordingly, spreading the data associated with Clusters A, B, and F across dies in both Bank 0 and Bank 1 allows at least some of the data associated with different clusters but with the same cluster sequence or association to be transferred in parallel. Similarly, if the non-volatile memory system 100 receives a host read request that requests data associated with Cluster C to be read, there may be a high likelihood that the host will request or has already requested data associated with Clusters B, E, and D to be read as well. As shown in FIG. 13, Clusters C and E are stored in dies in different banks so that these data sets may be transferred to the controller 102 in parallel. Additionally, rather than confine the data associated with Cluster D to a single bank, it instead may be spread across dies in both banks so at least a portion of the data associated with Cluster D may be transferred in parallel with data associated with Cluster E or in parallel with Cluster C. Other ways of storing data associated with different clusters but with the same cluster sequence or association may be possible, and may depend on the number of channels available for data transfer and/or the sizes of the different data sets.

Referring to FIGS. 6 and 13, when the second stage filter module 614 identifies a cluster sequence, the second stage filter module 614 may provide a sequence notification to an address management notification module 618, which may, in turn, provide the notification to the address management module 160. The notification may simply notify the address management module 160 that the second stage filter module 614 has identified a cluster sequence, or alternatively may identify the cluster sequence it identified. In some implementations, the notification may be a direct instruction that commands the address management module 160 to determine new physical addresses for and/or rearrange the data associated with a cluster sequence. For other implementations, the notification is a suggestion to the address management module 160 that merely causes the address management module 160 to be aware of the cluster sequence. The address management module 160 may or may not act upon the notification, or may determine to act at a later time.

In some example configurations, the address management module 160 may not be configured to automatically or immediately rearrange and/or determine new physical addresses for data associated with a cluster sequence upon receipt of the notification, regardless of whether the notification is a command or a mere suggestion. Instead, the address management module 160 may determine new physical addresses for and/or to rearrange data upon predetermined time intervals and/or occurrences of predetermined events. When the predetermined time interval or an event occurs, the address management module 160 may check to see whether it has received a notification from the address management notification module 618. If it has, then the address management module 160 may identify new physical addresses and rearrange the data, assuming that doing so would increase the amount of data that can be transferred to the controller 102 in parallel. For example, suppose in FIG. 13, Cluster B data is initially stored in one of the dies configured in Bank 0 along with Cluster A data. In response to the predetermined time interval or the event occurring, the address management module 160 may determine whether there is storage space available in a die configured in Bank 1 to store either Cluster A data or Cluster B data. If so, the address management module 160 may determine a new physical address to store either Cluster A data or Cluster B data in Bank 1 so that these data sets may be transferred in parallel to the controller 102 at a future time. In particular example implementations, the address management module 160 may determine new physical addresses and rearrange the data lithe data is the subject of the event that occurred.

Example events may be data relocation or "garbage collection" events in which a data relocation module 162 determines that data stored in a block (or a plurality of blocks) is to be relocated to a new area of the non-volatile memory dies 104. In response to the determination, the data relocation module 162 may notify the address management module 160 of the data that is be relocated so that the address management module 160 may determine new storage locations for the data and have the data moved. In doing so, the address management module 160 may be check whether it has received any notifications from the address management notification module 618. If it has, then the address management module 160 may determine whether any of the data to be relocated is part of a cluster sequence. If so, then the address management module 160 may also relocate the other data of the cluster sequence if it is not already part of the data identified as needing to be relocated. Further, by knowing that at least some of the data to be relocated is part of a cluster sequence, the address management module 160 may determine new physical addresses for that data in such a way that the data associated with the sequence is moved to dies located in as many different banks as possible in order to maximize the amount of data that may be transferred to the controller 102 in parallel.

One data relocation event may be and/or be associated with a read error event in which data is transferred from the memory dies 104 to the controller 102 in response to a host read request, and prior to the controller 102 sending the data to the host, the ECC engine 124 (FIG. 2A) determines that the number of errors in the data has exceeded a threshold level. In response to this determination, the data relocation module 162 may determine to relocate the data from where it is currently being stored in the memory dies 104 to a new location. Other data relocation events may include those associated with background read processes and/or read-cycle monitoring such that errors identified in the background read processes and/or the number of times a certain block has been read indicates to the data relocation module 162 that a reliability or confidence level associated with where the data is currently being stored has dropped to a certain level such that data relocation should be performed.

Figure 14:
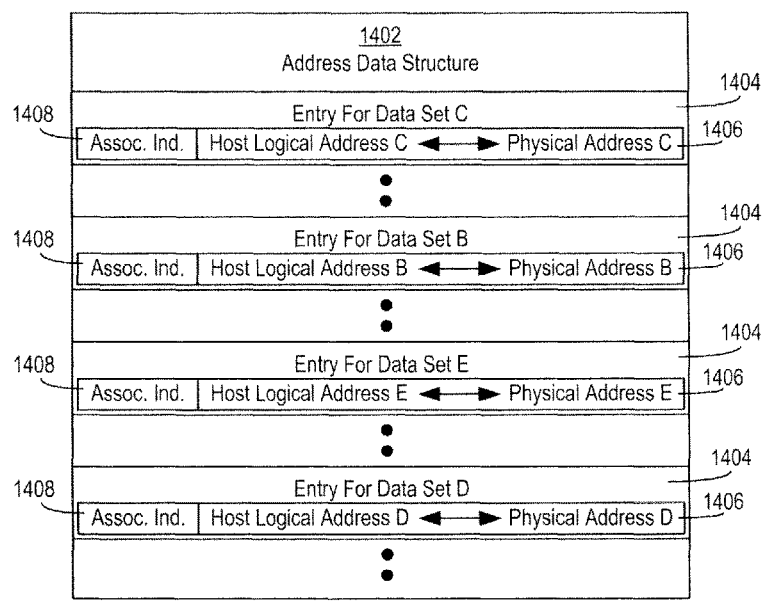
FIG. 14 is a schematic diagram of an example address data structure.

In addition, the address management module 160 may be configured to keep track of which logical addresses are associated with cluster sequences or otherwise are part of a cluster association. As previously described, the controller 102 may be configured to maintain a directory system of one or more address data structures that track and identify the logical-physical address relationships or mappings that the controller 102 may access to determine where in the non-volatile memory system 100 the most recent version of the data is stored. FIG. 14 shows a schematic diagram of an example address data structure 1402. As shown in FIG. 14, the address data structure 1402 may include a plurality of entries 1404 for different sets of data. Each entry 1404 may include a logical-physical mapping 1406 that identifies a host logical address for a particular data set and an associated physical address that identifies where in the non-volatile memory dies 104 that data set is located. Additionally, as shown in FIG. 14, each entry 1404 may further include a cluster association indicator ("Assoc. Ind.") field 1408 that includes an indication of whether that data set is part of a cluster association or sequence. For some example configurations, the cluster association indication in the field 1408 be a flag that indicates whether or not the data set for that entry is part of a cluster association or sequence. For other example configurations, the cluster association indication may indicate what cluster association or sequence that data set is a part of.

Referring to FIG. 13, when the address management notification module 618 notifies the address management module 160 that a cluster sequence has been identified, the address management module 160 may be configured to update entries 1404 of the data sets associated with that cluster sequence such that their cluster association indication fields 1408 indicate that they are associated with a cluster sequence. Depending on the information in the notification, the address management module 160 may be configured to access the cluster association database 616 to identify the data sets that are part of the cluster sequence.

When the address management module 160 determines to rearrange where data is stored, the address management module 160 may check the cluster association indicator fields 1408 to determine whether any of the data it is moving is part of a cluster association or sequence. For example, if the address management module 160 determines to move a data set C, the address management module 160 may check the indicator field 1408 of its associated entry 1404, identify that data set C is part of a cluster association, and then access the cluster association database 616 to determine the other data sets that are part of that cluster association. The address management module 1402 may then rearrange the data sets associated with that cluster association as described above.

In addition, when a host read request is received from a host, the address management module 160 may be configured to access the address data structure 1402 to identify a physical address associated with the logical address included in the host read request in order to retrieve the requested data from the non-volatile memory dies 104. In doing so, the address management module 160 may check the cluster association indicator field 1408 to identify whether the requested data is part of a cluster association or sequence. If it is, then the address management module 160 may perform address translations to determine physical addresses for each of the other data sets associated with that cluster association or sequence. The address management module 126 may then provide the physical addresses for requested data, in addition to physical addresses that are also part of the cluster association, to the sequencer 126 (FIG. 2A), to have the data sets associated with the cluster sequence retrieved from the memory dies 104. The sequencer 126 may then send one or more read commands to the non-volatile memory dies 104 to have the data sets sensed out of the memory arrays 142 and transferred back to the controller 102 to be stored in RAM 116 for decoding and transfer back to the host.

In some example configurations, the address management module 160 may indicate to the sequencer 126 which physical addresses correspond to logical addresses expressly identified in a host read request and which ones were not identified but nonetheless are part of a cluster sequence. For physical addresses not expressly identified, the sequencer 126 may have data that is stored at those physical addresses sensed out of the memory array 142 (FIG. 2B) but not transferred across a channel to the controller 102. The data that is not transferred may subsequently be transferred at a later time when read requests expressly identifying those data sets are received. In other example configurations, the sequencer module 126 may have all data sets associated with a cluster sequence transferred back to the controller 102, even those not identified in a host read request at the time the other data set is identified. In either case, populating the entries in the address data structure 1402 with information about cluster associations or sequences may be used to increase the rate at which data sets that are part of the associations or sequences may be retrieved from the non-volatile memory dies 104 and sent back to the host.

Figure 15:
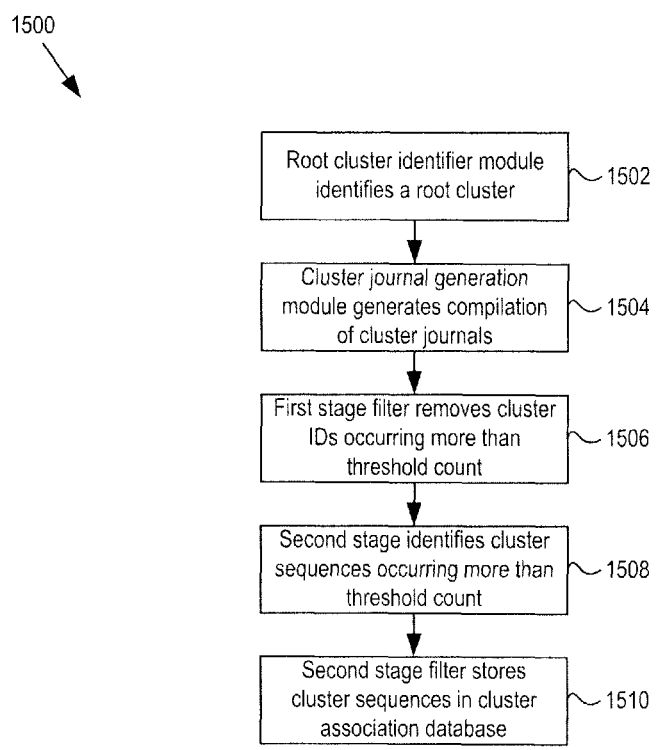
FIG. 15 is a flow chart of an example method of identifying a cluster sequence.

FIG. 15 is a flow chart of an example method 1500 of identifying a cluster association for a root cluster of data in a non-volatile memory system. At block 1502, a root cluster identifier module may identify a root cluster of data that it wants analyzed to see if it is associated with any cluster associations. The root cluster identifier module may provide a root cluster ID of the root cluster to a cluster journal generation module. At block 1504, in response to receiving the root cluster ID, the cluster journal generation module may generate a compilation of cluster journals, with each journal being populated with the root cluster ID. Each cluster journal may also be populated with an M-number of prior cluster IDs and an N-number of subsequent cluster IDs. The cluster journal generation module may store the compilation in an unfiltered cluster journal database.

At block 1506, a first stage filter module may retrieve the cluster journal compilation from the unfiltered cluster journal database and remove from the cluster journals those cluster IDs that are populated in a cluster journal less than a threshold cluster count. Timestamp information indicative of idle periods and suspend/power-on information may also be removed from the cluster journals during the first stage filtering. At block 1508, a second stage filter module may receive the initially filtered cluster journal compilation and identify sequences of cluster IDs that include the root cluster ID. The second stage filter module may further determine which if any of those sequences occur more than a threshold sequence count, as previously described. At least some of the sequences may be a combination of prior sequences of prior cluster IDs and subsequent sequences of subsequent IDs that were populated in the same cluster journal. The second stage filter may identify those sequences occurring more than the threshold sequence count in the compilation as identifying cluster associations. At block 1510, the second stage filter may store identified sequences occurring more than the threshold sequence count in the compilation in a cluster association database.

Figure 16:
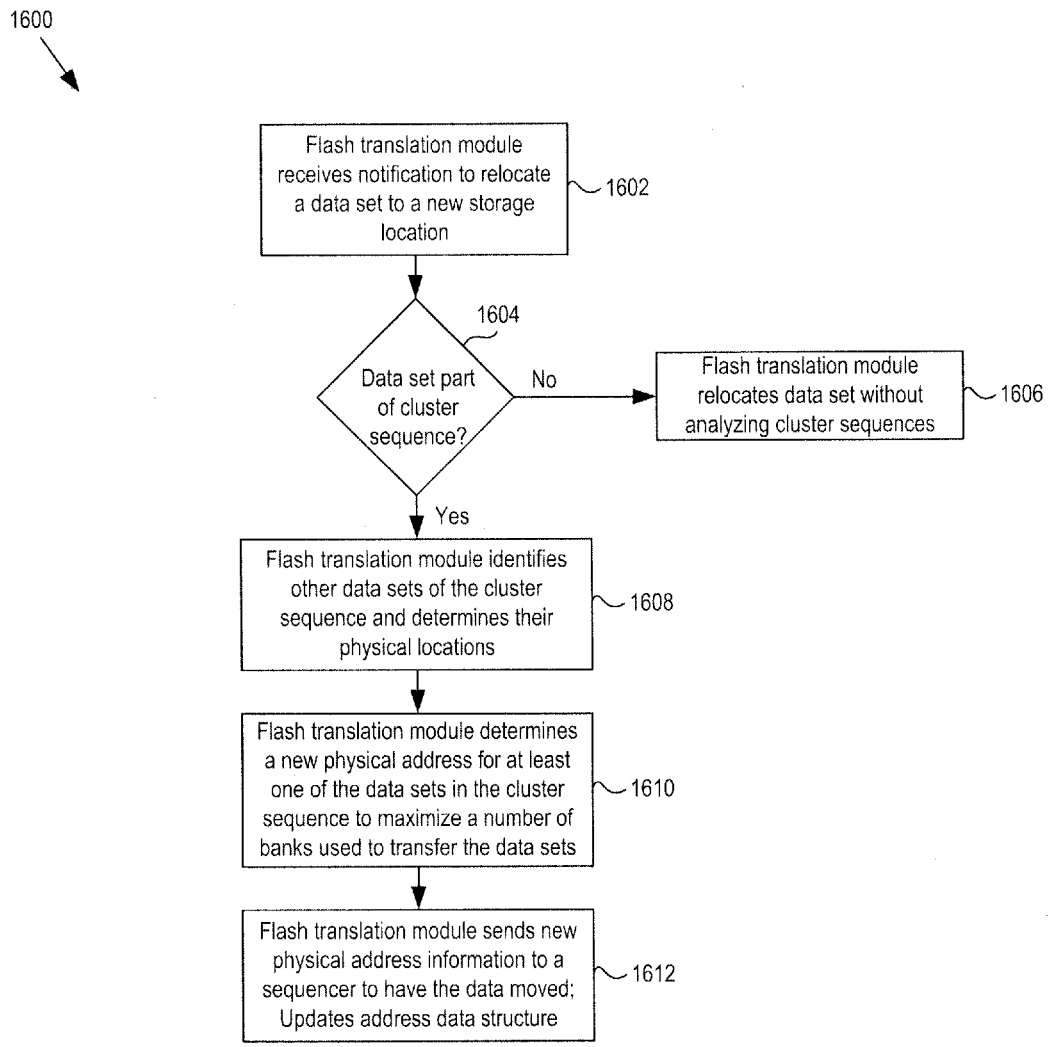
FIG. 16 is a flow chart of an example method of determining new physical addresses for data sets associated with a cluster sequence to maximize read parallelism.

FIG. 16 is a flow chart of an example method 1600 of relocating at least some of different data sets that are part of the same cluster association in a non-volatile memory system. At block 1602, an address management module may receive notification from a data relocation module that a data set is to be moved from a current storage location to a new storage location. At block 1604, the address management module may determine whether the data set is part of a cluster sequence. In some example methods, the address management module may check an entry associated with the data set in an address data structure that tracks logical-physical mappings for the data sets and/or a cluster association database that tracks cluster sequences. If not, then at block 1606, the address management module may determine a new storage location for the data and have the data set moved to the new storage location without considering cluster sequence information. However, if at block 1604 the data set is part of a cluster sequence, then at block 1608, the address management module may identify the other data sets of the cluster sequence and identify their physical storage locations (i.e., physical addresses).

At block 1610, the address management module, using the physical storage location information of the data sets of the cluster sequence, may determine new physical addresses for at least the initial data set, and possibly one or more of the other data sets associated with the cluster sequence in order to maximize a number of banks used to transfer the data sets. At block 1612, the address management module may send the new physical address information to the sequencer to have the data moved. Additionally, the address management module may update the physical address information in the address data structure so that the logical address information is now mapped to the new physical address information.

Figure 17:
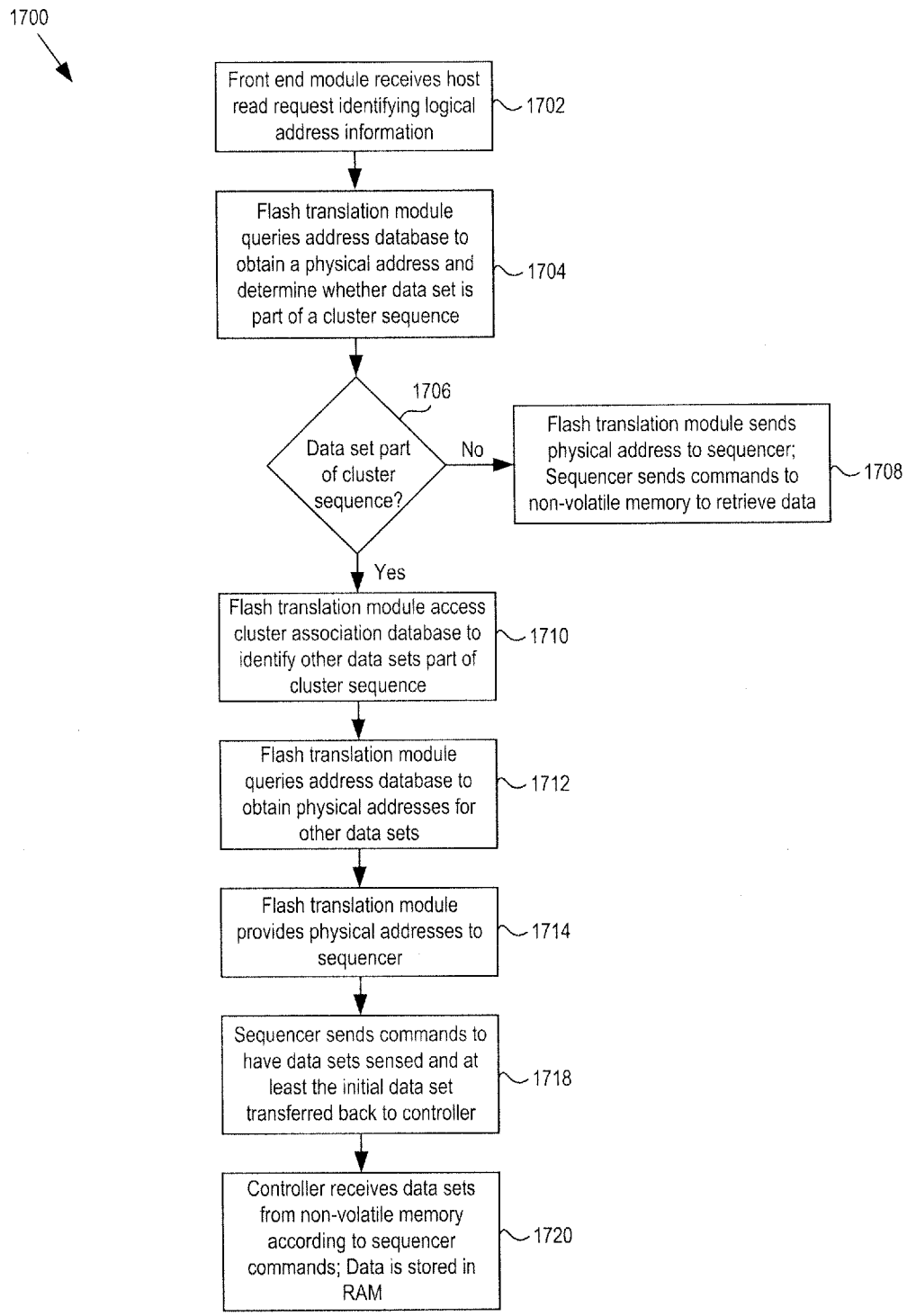
FIG. 17 is a flow chart of an example method of identifying data sets associated with a cluster sequence upon receiving a host read request.

FIG. 17 is a flow chart of an example method 1700 of sending instructions to non-volatile memory to retrieve a plurality of data sets that are part of a same cluster sequence. At block 1702, a front end module may receive a host read request to read a data set of the plurality of data sets. The host read request may include a set of logical address information associated with the data set. The front end module may provide the logical address information to an address management module. At block 1704, in response to receiving the logical address information, the address management module may query an entry in an address data structure associated with the logical address information to identify a physical address associated with the data set. In addition, the address management module may check the entry to determine whether the data set is associated with a cluster sequence.

At block 1706, if the data set is not associated with a cluster sequence, then at block 1708, the address management module may provide the physical address of the data set to a sequencer, and the sequencer may provide one or more sequencer commands to the non-volatile memory to retrieve the data set. The method 1700 may then end. Alternatively, at block 1706, if the address management module identifies that the data set is associated with a cluster sequence, then at block 1710, the address management module may access a cluster association database to identify other data sets that are also part of the cluster sequence. At block 1712, the address management module may query the address database with logical address information of those other data sets to identify physical addresses for those other data sets. For some example methods, at block 1712, the address management module may further analyze the entries of those other data sets and/or the cluster association database to determine whether any of the data sets are also part of other cluster sequences. If so, then the address management module may identify additional data sets that are part of those other cluster sequences and their associated logical addresses and query the address data structure to obtain their physical addresses.

At block 1714, the address management module may provide the physical addresses to a sequencer. At block 1716, the sequencer may send commands to non-volatile memory to have the data sets sensed out of the non-volatile memory. For some examples, the commands may instruct the non-volatile memory to transfer back to the controller only the data set associated with the logical address information identified in the initial host read request from block 1702, while the other data sets are sensed but not transferred back to the controller. Some or all of these other data sets may ultimately be transferred back to the controller when host read requests are actually received by the front end module requesting that these data sets be read. For other methods, the commands may instruct the non-volatile memory to transfer at least some of the other data sets back to the controller as well. At block 1718, the controller may receive one or more of the data sets from the non-volatile memory, which may be stored in a RAM before being decoded and ultimately sent back to the host.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
    non-volatile memory;
    a controller configured to:
        identify a root cluster of data of a plurality of data sets stored in the non-volatile memory;
        populate a cluster journal with a plurality of cluster identifications (IDs) based on a plurality of host addresses included in host read requests from a host, the plurality of cluster IDs comprising a root cluster ID of the root cluster, a prior cluster ID, and a subsequent cluster ID, the prior cluster ID associated with a first host address included in a first host read request received prior to a second host read request including a second host address associated with the root cluster ID, the subsequent cluster ID associated with a third host address included in a third host read request received subsequent to the second host read request;
        identify a cluster sequence of cluster identifications (IDs) for the root cluster ID based on the populated cluster journal, the cluster sequence comprising the prior cluster ID, the root cluster ID, and the subsequent cluster ID;
        receive the second host address in a fourth host read request;
        in response to receipt of the second host address, determine to sense the root cluster of data and a data set of the plurality of data sets associated with the prior cluster ID based on the cluster sequence; and
        send sequencer commands associated with the root cluster of data and the data set to instruct the non-volatile memory to sense the root cluster of data and the data set.

2. The non-volatile memory system of claim 1, wherein the controller is configured to identify the root cluster of data in response a number of received sets of host address information reaching a threshold number.

3. The non-volatile memory system of claim 1, wherein the cluster journal comprises one of a plurality of cluster journals, and
    wherein the controller is configured to identify the cluster sequence based on relative positions of the root cluster ID and the prior cluster ID in a threshold number of the plurality of cluster journals.

4. The non-volatile memory system of claim 3, wherein the controller is further configured to:
    remove, from the plurality of cluster journals, cluster IDs of the plurality of cluster IDs that are populated in the plurality of cluster journals a number of times that is less than a threshold cluster count; and
    identify the cluster sequence after the controller removes the cluster IDs that are populated less than the threshold cluster count.

5. The non-volatile memory system of claim 1, wherein the controller is configured to identify that the cluster sequence occurs among the plurality of cluster IDs more than a threshold sequence count.

6. The non-volatile memory system of claim 1, wherein the controller is further configured to:
    maintain an address data structure that associates sets of host address information with sets of physical address information for the plurality of data sets;
    determine that the root cluster of data is associated with the cluster sequence in response to a query of an entry in the address data structure to obtain a set of physical address information for the root cluster of data.

7. The non-volatile memory system of claim 6, wherein the controller is further configured to:
    query the address data structure to determine at least one other set of physical address information for the data set.

8. The non-volatile memory system of claim 1, wherein the controller is further configured to:
    detect to move the root cluster of data from a current storage location to a new storage location, and
    in response to the detection, determine the new storage location to be associated with a different bank than a bank with which a storage location of the data set is associated.

9. The non-volatile memory system of claim 1, further comprising a cluster association database,
    wherein the controller is configured to:
        maintain the cluster sequence in the cluster association database; and
        determine that the data set is associated with the cluster sequence in response to access of the cluster association database.

10. A method of retrieving data associated with a cluster sequence stored in non-volatile memory, the method comprising:
    identifying, with a controller, a root cluster of data of a plurality of data sets stored in the non-volatile memory;
    populating, with the controller, a cluster journal with a plurality of cluster identifications (IDs) based on a plurality of host addresses included in host read requests from a host, the plurality of cluster IDs comprising a root cluster ID of the root cluster, a prior cluster ID, and a subsequent cluster ID, the prior cluster ID associated with a first host address included in a first host read request received prior to a second host read request including a second host address associated with the root cluster ID, the subsequent cluster ID associated with a third host address included in a third host read request received subsequent to the second host read request;
    identifying, with the controller, a cluster sequence for the root cluster ID based on the populated cluster journal, the cluster sequence comprising the prior cluster ID, the root cluster ID, and the subsequent cluster ID;

receiving, with the controller, the second host address included in a fourth host read request to request the root cluster of data to be read from the non-volatile memory;

in response to receiving the fourth host read request, querying, with the controller, an address data structure to identify a physical address associated with the second host address;

in response to querying the address database, identifying, with the controller, that the root cluster of data is associated with a cluster sequence of data clusters;

querying, with the controller, a cluster association database that maintains a plurality of cluster sequences;

in response to querying the cluster association database, identifying, with the controller, a data set that is associated with the prior cluster ID of the cluster sequence; and sending, with the controller, commands to the non-volatile memory that instructs the non-volatile memory to sense the root cluster of data and the data set.

11. The method of claim 10, further comprising:

generating, with the controller, a journal compilation associated with the root cluster of data, the journal compilation identifying the plurality of cluster IDs including the root cluster ID; and identifying, with the controller, the cluster sequence among the plurality of cluster IDs identified in the journal compilation.

12. The method of claim 10, further comprising:

identifying, with the controller, the root cluster ID in response to a received number of sets of host address information reaching a threshold number.

13. The method of claim 11, wherein identifying the cluster sequence comprises identifying, with the controller, the cluster sequence based on relative positions of the root cluster ID and the prior cluster ID occurring more than a threshold number of times in the journal compilation.

14. The method of claim 11, further comprising:

counting, with the controller, numbers of times that the plurality of cluster IDs are populated in the journal compilation; and removing, with the controller, cluster IDs of the plurality of cluster IDs that are populated in the journal compilation less than a threshold cluster count.

15. The method of claim 10, further comprising:

querying, with the controller, the address data structure to determine at least one other physical address for the at least one other data set; and providing, with an address management module, the physical address for the data set and the at least one other physical address for the at least one other data set to a sequencer module to generate the commands.

* * * * *